United States Patent [19]

Katto

[11] Patent Number: 5,696,551
[45] Date of Patent: Dec. 9, 1997

[54] THREE-DIMENSION PICTURE CODING SYSTEM

[75] Inventor: Jiro Katto, Tokyo, Japan

[73] Assignee: NEC Corporation, Tokyo, Japan

[21] Appl. No.: 720,378

[22] Filed: Sep. 27, 1996

[30] Foreign Application Priority Data

Sep. 27, 1995 [JP] Japan .................................. 7-249961

[51] Int. Cl.⁶ .............................. H04N 13/00; H04N 5/14
[52] U.S. Cl. ........................... 348/43; 348/42; 348/699
[58] Field of Search ........................... 348/42, 43, 421, 348/699, 384, 47; 382/162, 164, 167, 236, 246

[56] References Cited

U.S. PATENT DOCUMENTS

| | | | |
|---|---|---|---|
| 4,751,570 | 6/1988 | Robinson | 348/43 |
| 5,140,415 | 8/1992 | Choquet | 348/43 |
| 5,142,642 | 8/1992 | Sudo | 348/47 |
| 5,172,236 | 12/1992 | Takemoto et al. | 358/227 |
| 5,296,926 | 3/1994 | Nagura | 348/43 |
| 5,329,365 | 7/1994 | Uz | 348/384 |
| 5,612,735 | 3/1997 | Haskell et al. | 348/43 |

FOREIGN PATENT DOCUMENTS 3-80676  4/1991  Japan .

OTHER PUBLICATIONS

Schupp et al, "Data Compression of 3-D Moving Pictures using Adaptive Motion/Disparity Compensation", 5-1, Montion Picture Coding Symposium, 1988, pp. 63-64.

Nogaki, "A Study on Applying MPEG-2 Video Coding for Stereo Motion Pictures", 3-10, Picture Coding Symposium, 1994, pp. 43-44.

Izumi et al, "Combining Color and Spatial Information for Segmentation", IEICE, 1991, pp. 7-392.

Yokoyama et al, "Image segmentation for video coding using motion information", IEICE, 1994, p. 156.

Kodama et al, "Enhanced Image Acquisition by Using Differently Focused Multiple Images", 9-2, ITE, 1995, pp. 149-150.

Primary Examiner—Tommy P. Chin
Assistant Examiner—Luanne P. Din
Attorney, Agent, or Firm—Foley & Lardner

[57] ABSTRACT

In order to improve coding efficiency, a segmentation circuit performs segmentation of an input picture by clustering referring to distance data calculated from pixel values of the input data, statistic information and a disparity compensated predictive picture, a statistic information calculator calculates an average and dispersion of pixel values of each segment according to pixel values of the input data and segmentation data from the segmentation circuit, a disparity calculator calculates disparity vectors of a horizontal dimension for minimizing error of the disparity compensated picture from pixel values of a reference picture, those of the input picture and the segmentation data, and a disparity compensating predictor generates the disparity compensated predictive picture.

19 Claims, 20 Drawing Sheets

FIG. 15
PRIOR ART
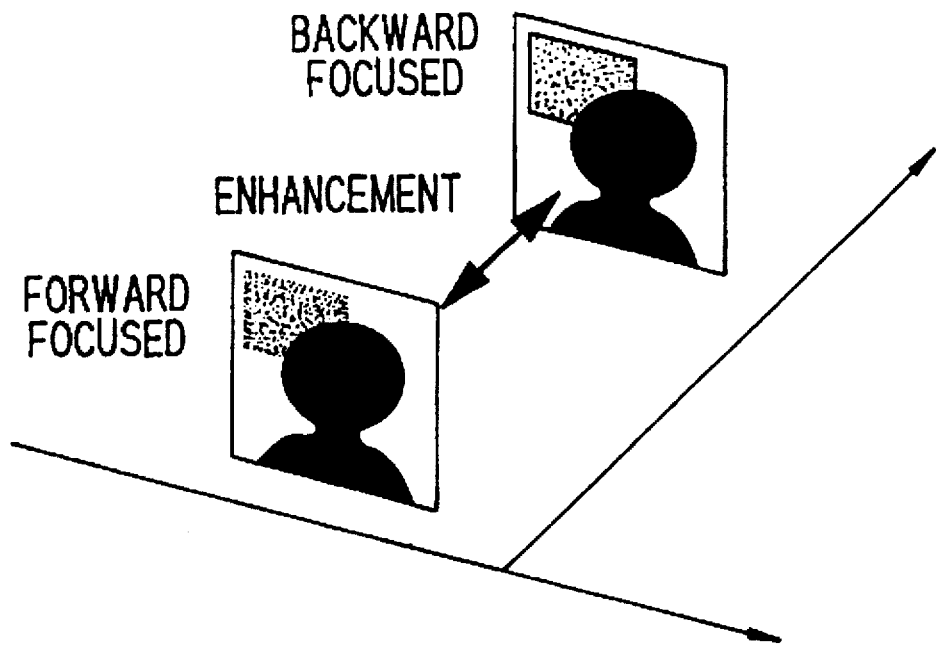
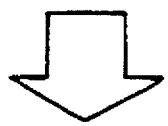
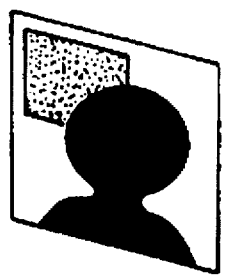
ENHANCED PICTURE

THREE-DIMENSION PICTURE CODING SYSTEM

BACKGROUND OF THE INVENTION

This invention relates to a high efficiency three-dimension picture coding system.

FIG. 14 illustrates concept of disparity extraction of stereo pictures.

As for stereo picture coding system, disparity compensation predictive coding using block matching method is well known, wherein either a left-eye picture or a right-eye is segmented into blocks, and a disparity vector is defined, for each of the segmented blocks, from difference of coordinates between the block and a region found in the other picture to have a highest similarity to the block, then the coding is performed for the disparity vectors and differential signals between the concerning picture and a predictive picture composed of the regions each having the highest similarity to each block of the concerning picture.

As an example of the system, in a preliminary paper entitled "Data Compression of 3-D Moving Pictures using Adaptive Motion/Disparity Compensation" by Schupp et al, 5-1 of the Picture Coding Symposium, 1988, there is presented a method for composing a predictive picture, wherein the block matching method is applied between pictures having a time difference as well as between right and left eye pictures and a disparity vector or a motion vector giving higher similarity is selected adaptively for each block.

In another paper entitled "A Study on Applying MPEG-2 VIDEO Coding for Stereo Motion Pictures", preliminary paper 3-10 of the Picture Coding Symposium, 1994, Nogaki reported a coding method for stereo pictures making use of the MPEG-2, an international standard for motion picture coding by the block matching method.

In these systems, coding efficiency is said to be sharply improved compared to those without disparity prediction.

The block matching method, however, brings about unnatural distortion on the predictive picture, because the disparity vectors or the motion vectors uniformly defined in a block by the block matching can not represent disparities of all objects in the block correctly. This distortion degrades sense of presence with unnatural deepness when the predictive picture is used directly for stereo view, leaving a room untouched for improving the coding efficiency.

There are also approaches for recomposing a predictive picture more natural by defining vectors for each of segments having a variety of forms obtained by dividing a picture optionally. As for concrete means for the segmentation, there are proposed, for example, a method making use of color brightness histograms, a method based on edge line extraction, or a method by clustering. Among them is known a method called 5-dimensional clustering described in a paper D-680 entitled "Combining Color and Spatial Information for Segmentation", by Izumi et al, Spring National Congress of IEICE (Institute of Electronics, Information and Communication Engineers), 1991.

In the 5-dimensional clustering, considering a 5-dimensional space expressed by five features as a combination of the three dimensional color space of R, G and B components and the two dimensional x-y plain, a distance $d_n$ between a concerning pixel and a n-th cluster is defined by a following equation (1).

$$d_n^2 = w_0 \cdot [(R - \bar{R}_n)^2 + (G - \bar{G}_n)^2 + (B - \bar{B}_n)^2] + \quad (1)$$
$$w_1 \cdot [(x - \bar{x}_n)^2 + (y - \bar{y}_n)^2]$$

where;

(R, G, B) and (x, y) are color and geometrical coordinates of the concerning pixel, and $(\bar{R}_n, \bar{G}_n, \bar{B}_n)$ and $(\bar{x}_n, \bar{y}_n)$ are average color coordinates and a center of gravity of the n-th cluster, respectively. $w_0$ and $w_1$ being weight coefficients.

By calculating distances $d_n$ for clusters surrounding the concerning pixel, the pixel is attributed to a cluster n which gives a minimum value of the distances $d_n$.

Thus, the paper reports, a picture segmentation robust against noises can be performed without losing local information.

Further, in a paper D-150 entitled "Image segmentation for video coding using motion information" by Yokoyama et al, Autumn National Congress of IEICE, 1994, the above clustering algorithm is expanded in motion picture coding. In the paper, a 7-dimensional feature space composed of the Y, Cr and Cb color space, the x-y plane and a 2-dimensional motion vector space is considered, and the distance $d_n$ of a concerning pixel to a n-th cluster is defined as follows.

$$d_n^2 = w_0 \cdot [(Y - \bar{Y}_n)^2 + (Cr - \bar{Cr}_n)^2 + (Cb - \bar{Cb}_n)^2] + \quad (2)$$
$$w_1 \cdot [(x - \bar{x}_n)^2 + (y - \bar{y}_n)^2] +$$
$$w_2 \cdot [(v_x - v_{n,x})^2 + (v_y - v_{n,y})^2]$$

where, $(v_x - v_{n,x})$ and $(v_y - v_{n,y})$ are motion vectors for the concerning pixel and the n-th cluster, respectively, detected by the block matching methods $w_2$ being their weight coefficient.

By clustering every pixel according to $d_n^2$ thus calculated, it is reported that a segmentation enabling more efficient coding can be obtained with motion compensation, compared to clustering without motion vector information. This method is directly applicable also into segmentation for disparity compensated prediction concerning stereo pictures, by simply replacing motion vectors with disparity vectors.

However, even with the method of supple segmentation as just described, a considerable distortion is still left in predictive pictures in actual fact, resulting insufficient improvement of coding efficiency even compared to the block matching method.

This is a problem.

In another aspect, it can be said that unfocused regions are regarded as less important for observers, heretofore in coding systems for ordinary 2-dimensional pictures. This has been a proper choice also in view of coding efficiency, since unfocused region may be easily compressed. In three dimension pictures, however, observer's eye often moving back and forwards, unfocused region becomes an important factor to degrade observer's sense of presence.

For the reason, some approaches are studied for recomposing a pan-focused picture, that is, a picture focused in every region containing objects of different depths, from a plurality of pictures taken with different focal distances, as illustrated in FIG. 15.

As an example, there is a paper entitled "Enhanced Image Acquisition by Using Differently Focused Multiple Images" by Kodama et al, 9-2 of the 1995 ITE (Institute of Television Engineers) Annual Convention, wherein more focused regions are selected from two differently focused pictures by comparing one of the pictures with pictures degraded from the other picture step by step by applying a point diffusion function for modeling pixels out of focus. The paper reports a picture sufficiently sharp up to details can be recomposed by the method, with improvement of accurate discrimination of pixels near edge lines.

However, when there are noise data in the pictures, the method can not recompose sufficiently sharp pictures since the noises are spread because of linear filtering of the point diffusion function.

In a Japanese patent application entitled "Apparatus for electrical pan-focusing" and laid open as a Provisional Publication No. 80676/91, there is disclosed, by Takemoto et al, an apparatus for recomposing a pan-focused picture by selecting blocks containing high frequency information the more intense from blocks divided from two input pictures differently focused. However, some unfocused blocks may be mixed unnaturally in the recomposed picture acquired by the apparatus, since the selection is performed block by block in the apparatus.

This is another problem.

PRINCIPLE AND EFFECT OF THE INVENTION

Therefore, a primary object of the invention is to provide a three dimension picture coding system which can represent high reality by extracting disparity vectors with few predictive errors as well as easily compressed as for disparity, and as for deepness, by realizing a picture clearness enhancement robust against noises.

As for the disparity extraction, an 8-dimensional clustering is performed for stereo picture segmentation of the present invention, wherein disparities of pixels in the three color space are considered in addition to the 5-dimensional clustering beforehand described proposed by Izumi et al, in the Y, Cr and Cb color space in place of R, G and B color space of Izumi.

The distance $d_n$ of a concerning pixel to a n-th cluster is defined as following equation (3) in the invention.

$$d_n^2 = w_0 \cdot [(Y-\overline{Y}_n)^2 + (Cr-\overline{Cr}_n)^2 + (Cb-\overline{Cb}_n)^2] + \quad (3)$$
$$w_1 \cdot [(x-\overline{x}_n)^2 + (y-\overline{y}_n)^2] +$$
$$w_2 \cdot [(Y-Y'_{\vec{v}_n})^2 + (Cr-Cr'_{\vec{v}_n})^2 + (Cb-Cb'_{\vec{v}_n})^2]$$

where;

(Y, Cr, Cb) and (x,y) are coordinates of the concerning pixel in the color space and the x-y plane, $(\overline{Y}_n, \overline{Cr}_n, \overline{Cb}_n)$ and $(\overline{x}_n, \overline{x}_n)$ are average color coordinates and the center of gravity of the n-th cluster, and $(Y'_{\vec{v}_n}, Cr'_{\vec{v}_n}, Cb'_{\vec{v}_n})$ are color coordinates of a pixel on a reference picture corresponding to the concerning pixel designated by disparity vector $\vec{v}_n$ calculated for the n-th cluster, $w_0$, $w_1$ and $w_2$ being weight coefficients.

The distances $d_n$ of the concerning pixel being calculated for each of clusters surrounding the pixel, the pixel is determined to belong to a cluster giving a minimum value of the distances $d_n$.

By repeating above described processes, a segmentation of the stereo pictures is finally obtained.

In the prior art beforehand described for clustering in the 7-dimensional feature space by Yokoyama et al, difference between a motion vector detected for a concerning pixel and that detected for a n-th cluster is considered. However, since values of vectors calculated for pixels are somewhat scattering, the predictive errors can not always sufficiently suppressed in the prior art, and obtained motion vectors themselves are also scattering.

On the other baud, difference of color coordinates between a concerning pixel and its corresponding pixel predicted by the disparity vector in the reference picture is considered in the invention when calculating the distance $d_n^2$ as an evaluation function, in place of the difference between vectors themselves in the prior art.

As an effect thereof, predictive errors can be sharply reduced in the invention providing a more natural disparity representation, resulting in an excellent disparity compensated predictive picture.

Further, also the vector scattering being suppressed, a high compression efficiency can be expected in the invention even when disparity vectors for all pixels are intra-coded as a picture.

Still further, also for the intra-coding of the disparity vectors for pixels, there can be directly applied ordinary compression algorithm developed for intra-coding of two dimension pictures, since one horizontal dimension is generally sufficient to be considered for disparity vectors, differently form motion vectors used for compensation of 2-dimensional movement of motion pictures.

In addition, stereo pictures of a sufficient quality can be represented even only from the disparity information without compensated with differential information, as predictive pictures far more excellent, objectively and subjectively as well, can be obtained here in the invention, than those obtained by the block matching method containing certain distortions.

As for the clearness enhancement by recomposing a pan-focused picture from pictures differently focused, also the clustering is applied in the invention.

In the prior art beforehand described of Kodama et al, linear filtering according to a point diffusion function is performed for modeling pixels unfocused. However, the linear filtering is susceptible to noises. This is the reason the clustering, known to be robust against noise, is applied for segmentation for obtaining a clearness enhanced picture.

A segmentation making use of the 5-dimensional clustering according to the equation (1) is performed in the invention for multiple pictures differently focused, and a most focused picture is selected for each segment considering, for example, relation of statistic information concerning averages and dispersion of color coordinates in the segment among the pictures.

In an embodiment of the invention, a clearness $c_n$ is defined for a n-th cluster of a picture as follows.

$$c_n^2 = \sum_{n' \in N} [(\overline{Y}_n - \overline{Y}_{n'})^2 + (\overline{Cr}_n - \overline{Cr}_{n'})^2 + (\overline{Cb}_n - \overline{Cb}_{n'})^2] \quad (4)$$

where, $(\overline{Y}_n, \overline{Cr}_n, \overline{Cb}_n)$ is an average value of color coordinates of the n-th cluster, and N is a set of clusters around the n-th cluster.

For each segment, a cluster of a picture which gives a maximum value of the clearness $c_n$ for the segment among the multiple pictures is selected as a most focused segment data to be used for recomposing the clearness enhanced picture. This is because contrast, accordingly difference of color coordinates between adjoining clusters should be largest on a most focused picture, as clustering is performed such as to gather resembling pixels.

As another method, a cluster of a picture with a maximum dispersion may be selected as the most focused segment. This method stands on a similar base to the prior method disclosed by Takemoto et al beforehand described of selecting a block having high frequency information the more intense.

In any way, by applying a supple segmentation by clustering, reality and robustness against noises of the picture clearness enhancement can be remarkably improved in the invention.

SUMMARY OF THE INVENTION

In order to embody the principle and the effect, three dimension picture coding system of the invention has at least one disparity extractor and at least two encoders, each of said at least one disparity extractor comprising a segmentation circuit, a statistic information calculator, a disparity calculator and a disparity compensating predictor; wherein:

said segmentation circuit performs segmentation of an input picture having disparity to a reference picture, by clustering each pixel of said input picture into one of segments whereof initial coordinates are predetermined, referring to distance data calculated from pixel values of said each pixel, statistic information delivered from said statistic information calculator, and pixel values, corresponding to said each pixel, of a disparity compensated predictive picture generated by said disparity compensating predictor;

said statistic information calculator calculates, for every of said segments, said statistic information including an average and dispersion of color components of pixels clustered into each of said segments and a center of gravity of said each of said segments, from said pixel values of said each pixel and segmentation data for said each pixel delivered from said segmentation circuit;

said disparity calculator calculates a disparity vector of a horizontal dimension, for each of said segments, which minimizes differential values between said input picture and said disparity compensated predictive picture, from pixel values of said reference picture, pixel values of said input picture, and said segmentation data delivered from said segmentation circuit;

said disparity compensating predictor generates said disparity compensated predictive picture for said input picture from pixel values of said reference picture, and disparity vectors supplied from said disparity calculator;

one of said at least two encoders encodes said reference picture; and each of the others of said at least two encoders encodes disparity vectors finally supplied from said disparity calculator of each of said at least one disparity extractor.

Thus, disparity compensated predictive pictures of high reality with few predictive errors and easily compressed can be represented in the three dimension picture coding system of the invention.

And therefore, when deferential data between the disparity compensated pictures and the reference picture are encoded, coding efficiency can be sharply improved.

Further for enhancing clearness of stereo pictures, the three dimension picture coding system of the invention is provided with a picture enhancer comprising a segmentation circuit, a first statistic information calculator, at least one second statistic information calculators, a focus discriminator and an enhanced picture reproducer; wherein:

said segmentation circuit performs segmentation of one of at least two input pictures, each of said at least two input pictures differently focused with each other, by clustering each pixel of said one of said at least two input picture into one of segments whereof initial coordinates are predetermined, referring to distance data calculated from pixel values of said each pixel, and statistic information delivered from one of said first statistic information calculator;

said first statistic information calculator calculates, for every of said segments, said statistic information of said one of said at least two input pictures including an average and dispersion of color components of pixels clustered into each of said segments and a center of gravity of said each of said segments, from said pixel values of said each pixel and segmentation data for said each pixel delivered from said segmentation circuit;

each of said at least one second statistic information calculator calculates, for every of said segments, said statistic information of each of the others of said one of said at least two input pictures including an average and dispersion of color components of pixels clustered into each of said segments, from said pixel values of said each pixel and segmentation data for said each pixel delivered from said segmentation circuit;

said focus discriminator selects, for each segment determined by said segmentation circuit, one of said at least two input pictures which has a focused segment giving a highest value of clearness for said each segment, calculating said clearness from statistic information concerning to said at least two input pictures delivered from said first statistic information calculator and said at least one second statistic information calculator; and said enhanced picture reproducer reproduces a clearness enhanced picture with focused segments of said at least two input pictures, each of said focused segments selected by said focus discriminator for each segment determined by said segmentation circuit.

Therefore, a picture clearness enhancement natural and robust against noises is realized in the invention.

BRIEF DESCRIPTION OF THE DRAWINGS

The foregoing, further objects, features, and advantages of this invention will become apparent from a consideration of the following description, the appended claims, and the accompanying drawings in which the same numerals indicate the same or the corresponding parts.

FIG. 15 illustrates concept of picture clearness enhancement.

DETAILED DESCRIPTION OF THE PREFERRED EMBODIMENTS

Now, embodiments of the present invention will be described in connection with the drawings.

Figure 1:
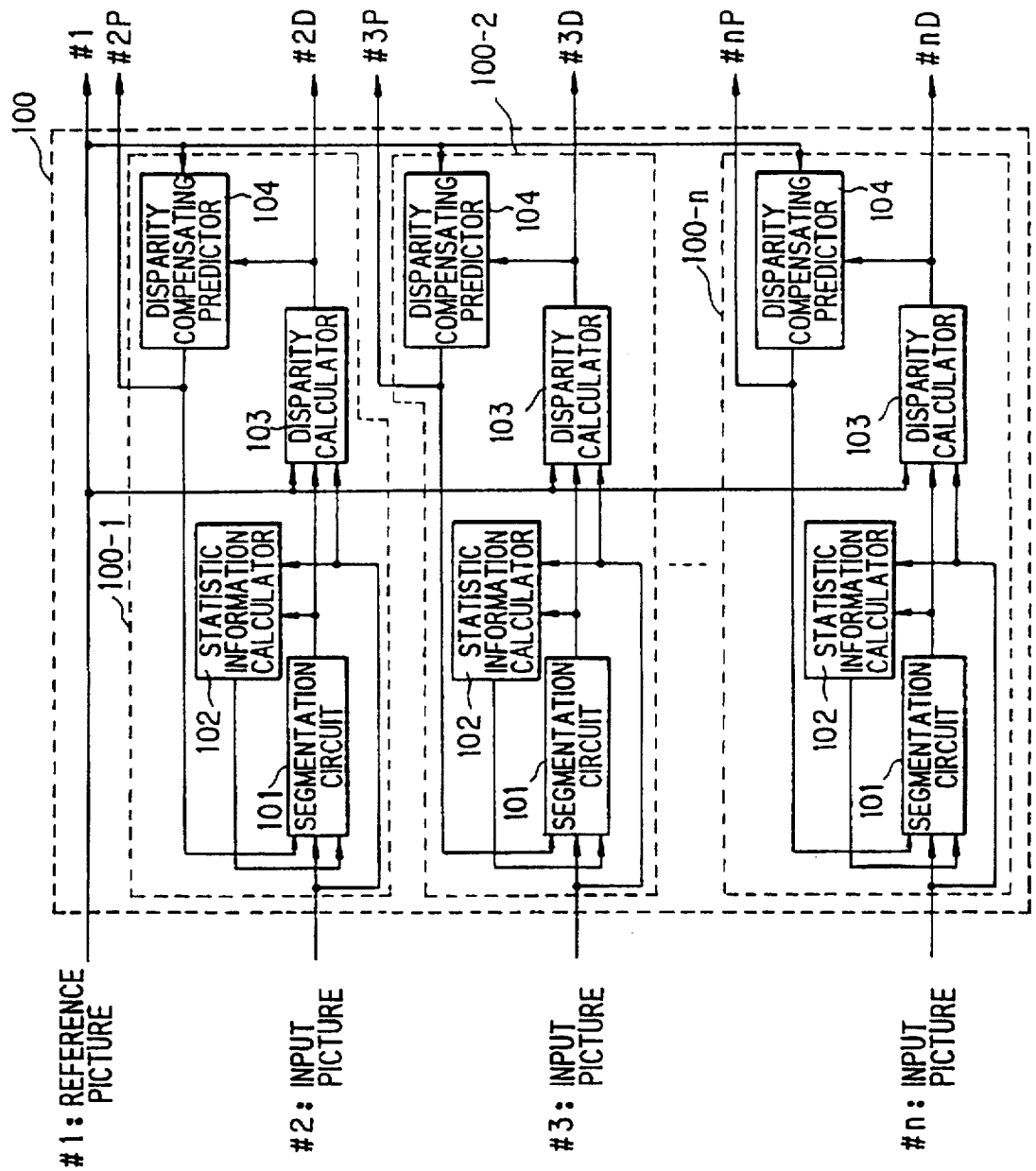
FIG. 1 is a block diagram illustrating a first embodiment of the invention for extracting disparity data.

FIG. 1 is a block diagram illustrating a first embodiment, a disparity extracting unit 100, of the invention for extracting (n−1) sets of disparity data #2D to #nD compared to a reference picture #1 of n pictures input therein from the other (n−1) pictures #2 to #n of the n pictures, having (n−1) disparity extractors 100-2 to 100-n; each of the (n−1) disparity extractors 100-2 to 100-n, 100-2 for example, comprising a segmentation circuit 101, a static information calculator 102, a disparity calculator 103 and a disparity compensating predictor 104; wherein:

the segmentation circuit 101 performs segmentation of each of the (n−1) pictures, the input picture #2 for example, making use of a clustering method with distance data calculated according to the equation (3) from pixel values of the input picture #2, static information delivered from the static information calculator 102, and pixel values of a disparity compensated predictive picture generated by the disparity compensating predictor 104;

the statistic information calculator 102 calculates statistic information for each segment as an average and dispersion of pixel values, a center of gravity, etc. from the pixel values of the input picture #2 and segmentation data delivered from the segmentation circuit 101;

the disparity calculator 103 calculate a disparity vector of a horizontal dimension for each segment which minimizes differential values between the input picture #2 and the disparity compensated predictive picture, from pixel values of the reference picture #1, pixel values of the input picture #2, and the segmentation data delivered from the segmentation circuit 101; and the disparity compensating predictor 104 generates the disparity compensated predictive picture for the input picture #2 from pixel values of the reference picture #1, and disparity vectors supplied from the disparity calculator 103.

Processes above described in the segmentation circuit 101, the statistic information calculator 102, the disparity calculator 103 and the disparity compensating predictor 104 are repeated several times for obtaining disparity data #2D for the input picture #2, which enable to reproduce a predictive picture #2P sufficiently disparity compensated and are sufficiently smoothed to be compressed easily.

Other disparity data sets #3D to #nD for the input pictures #3 to #n are similarly obtained in the disparity extractor 100-3 to 100-n of the disparity extracting unit 100.

Figure 17:
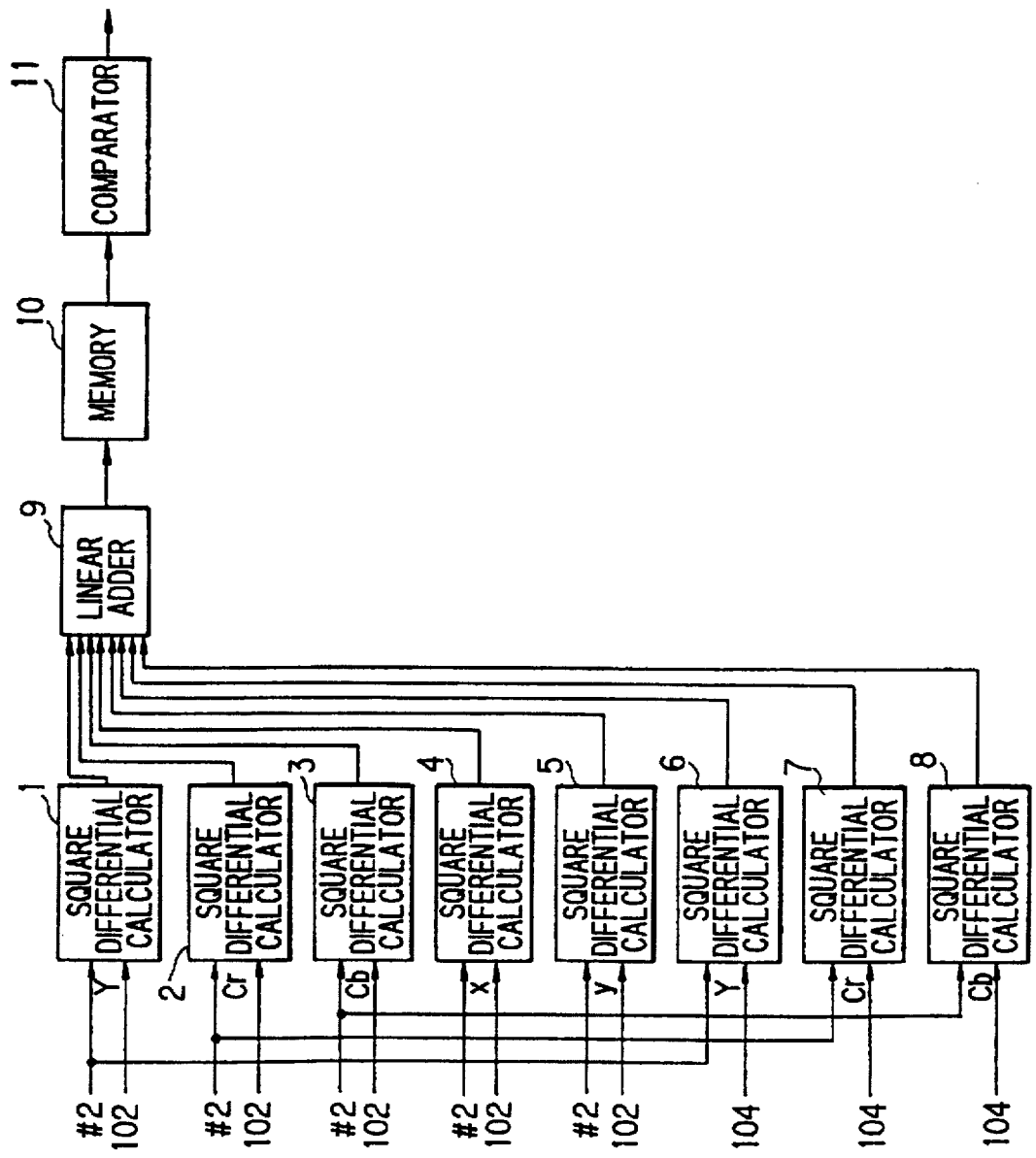
FIG. 17 is a block diagram illustrating an example of a detailed configuration of the segmentation circuit 101 in disparity extractors 100-2 to 100-n of FIG. 1.

FIG. 17 is a block diagram illustrating an example of a detailed configuration of the segmentation circuit 101 in a disparity extractor, 100-2 for example, of FIG. 1, comprising eight square differential calculators 1 to 8, a linear adder 9, a memory 10 and a comparator 11.

The square differential calculator 1 calculates a square of differential between Y color component of each pixel of the input picture #2, for example, and each average of those of clusters around the pixel delivered from the statistic information calculator 102, while the square differential calculators 2 and 3 calculate the same of Cr and Cb components respectively. Similarly, the square differential calculators 4 and 5 calculate the same of x ad y components respectively. And the square differential calculators 6, 7 and 8 calculates a square of differential between Y, Cr and Cb color components of each pixel of the input picture #2 and those of a corresponding pixel of the disparity compensated predictive picture #2P delivered from the disparity compensating predictor 104, respectively.

The linear adder 9 performs a linear summation to be stored in the memory 10 with the outputs of the square differential calculators 1 to 8 according to the equation (3).

The comparator 11 compares, for each pixel, the linear summations thus stored in the memory 10 for every clusters around the pixel, and selects a cluster which gives a minimum value among the linear summations for each pixel, for outputting index of the cluster as the segmentation data for the pixel.

Figure 18:
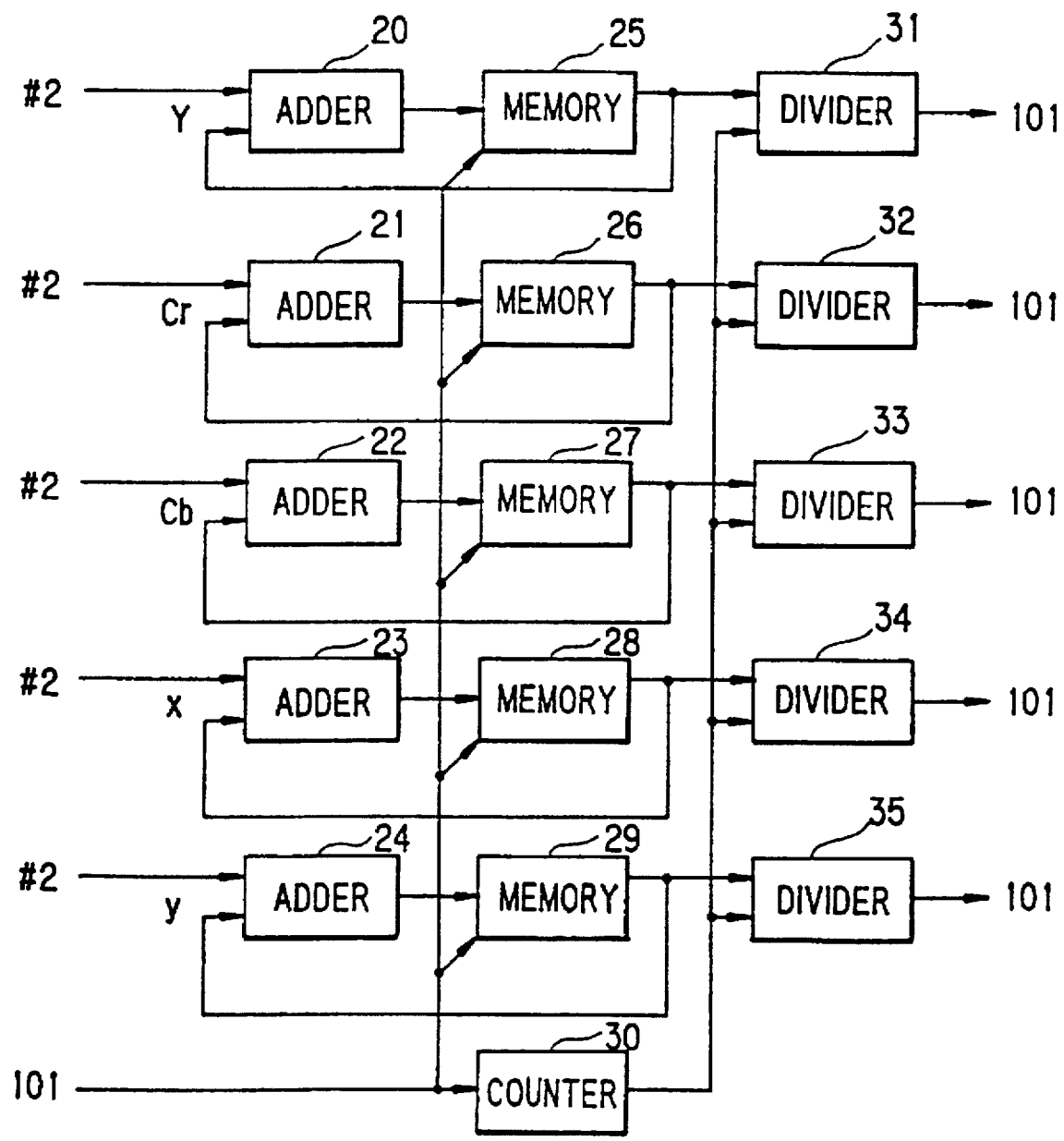
FIG. 18 is a block diagram illustration an example of the statistic information calculator 102 in disparity extractors 100-2 to 100-n of FIG. 1.

FIG. 18 is a block diagram illustration an example of the statistic information calculator 102 in a disparity extractor, 100-2 for example, of FIG. 1, comprising five adders 20 to 24, five memories 25 to 29, a counter 30 and five dividers 31 to 35.

The adder 20 adds value of Y component of each pixel of the input picture #2 to an accumulated value for a cluster indicated by the memory 25, while the adder 21 and 22 adds those of Cr and Cb components to corresponding values indicated by the memories 26 and 27. And the adder 23 and 24 do the same for the x and y components with memories 28 and 29.

The memory 25 supplies the accumulated value for the cluster where the concerning pixel to belong to the adder 20, and restores the accumulated value after the addition according to the segmentation data for the concerning pixel delivered from the segmentation circuit 101. And similarly, the memories 26 to 29 store accumulated values of Cr, Cb, x and y components for each cluster, respectively.

The counter 30 counts each number of pixels to be included in the clusters according to the segmentation data delivered from the segmentation circuit 101.

And, the dividers 31 to 35 divide accumulated values stored in the memories 25 to 29 for each cluster by each corresponding number of pixels counted in the counter for outputting the average values of each cluster of Y components, Cr components, Cb components, x components and y components of pixels in the cluster, respectively, as the statistic information of each segment.

Figure 19:
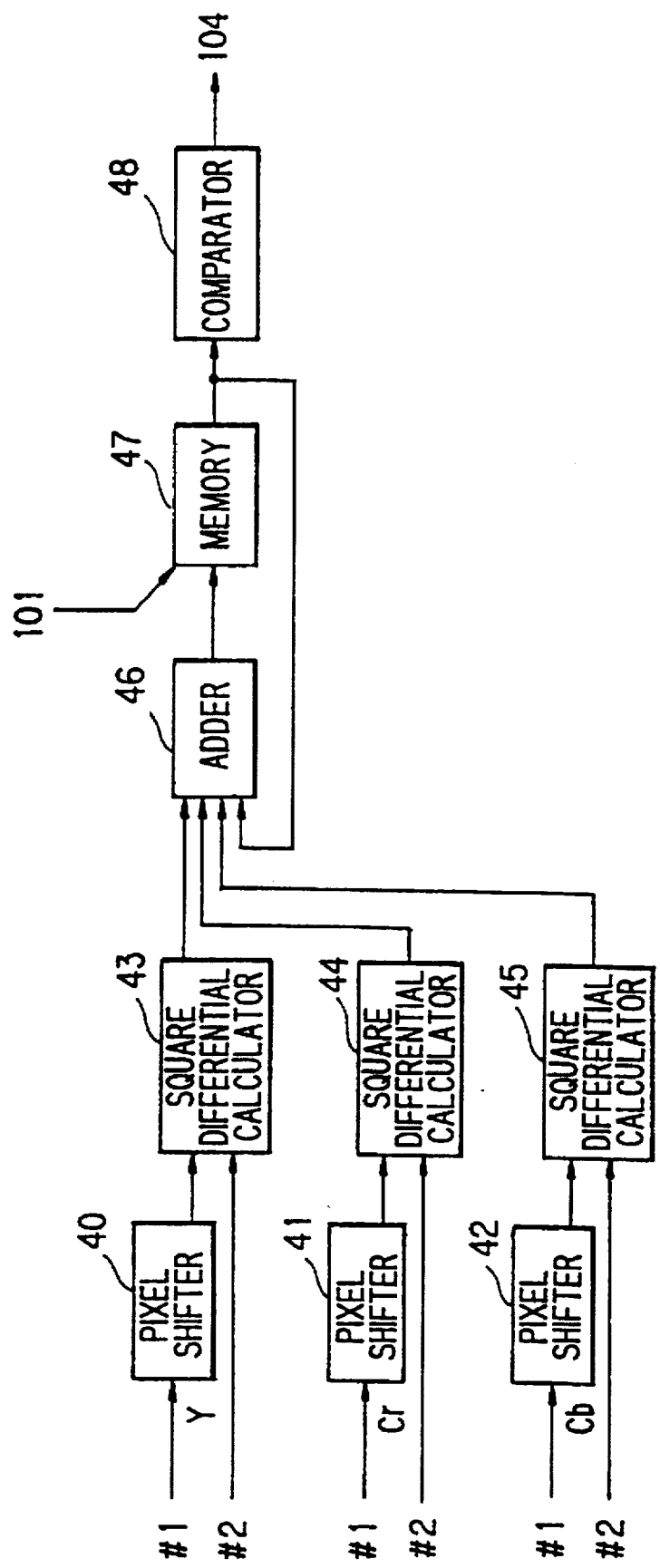
FIG. 19 is a block diagram illustrating an example of a detailed configuration of the disparity calculator 103 in disparity extractors 100-2 to 100-n of FIG. 1.

FIG. 19 is a block diagram illustrating an example of a detailed configuration of the disparity calculator 103 in a disparity extractor, 100-2 for example, of FIG. 1, comprising three pixel shifters 40 to 42, three square differential calculators 43 to 45, an adder 46, a memory 47 and a comparator 48.

The three pixel shifters 40 to 42 shift Y, Cr and Cb components of pixel values of the reference picture #1 in y-direction, right and leftwards, pixel by pixel for example, respectively. The three square differential calculators 43 to 45 calculate squares of differentials between Y, Cr and Cb components respectively, of pixels of the same coordinates of the reference picture #1 and the input picture #2 for each shift value.

The adder 46 add, for each shift value, outputs of the three square differential calculators 43 to 45 to a corresponding accumulated value stored in the memory 47 according to the shift values and the indexes of clusters where the concerning pixel of the input picture #2 belongs, which is restored in the memory 47 after the addition.

The comparator 48 selects a shift value for each cluster which gives a minimum value of the accumulated values stored in the memory 47 for the cluster, the shift value selected being output as the disparity vector for the cluster.

Figure 20:
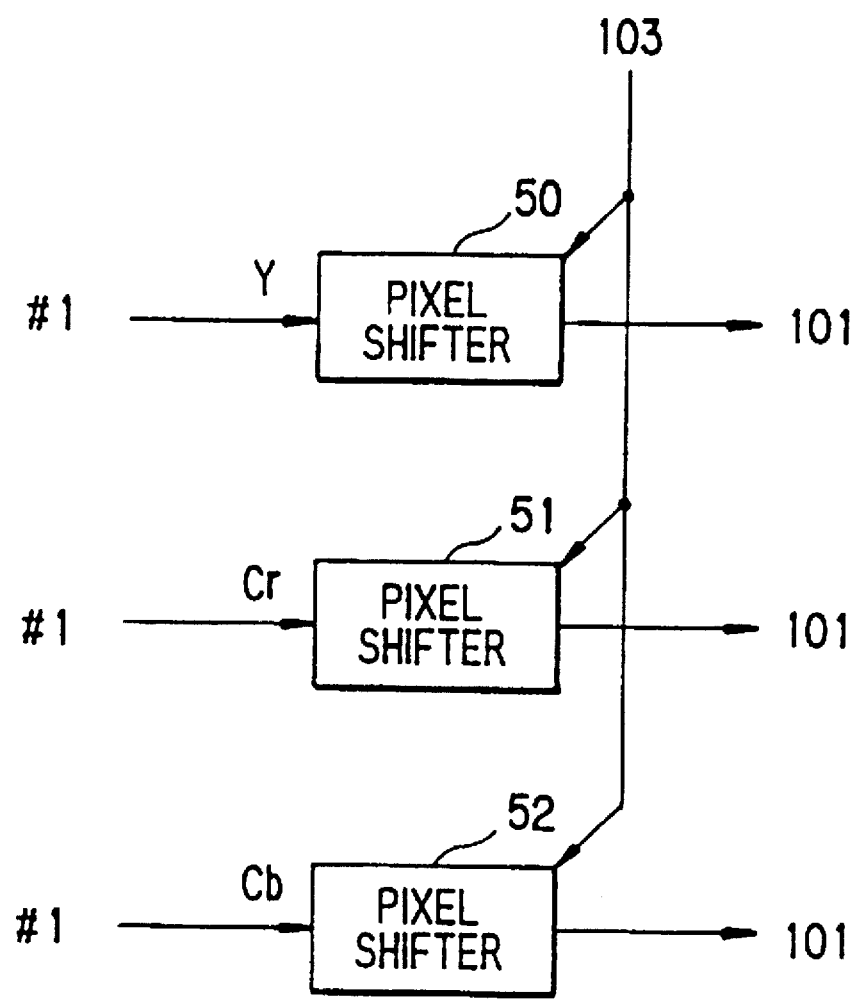
FIG. 20 is a block diagram illustrating an example of a detailed configuration of the disparity compensating predictor 104 in disparity extractors 100-2 to 100-n of FIG. 1.

FIG. 20 is a block diagram illustrating an example of a detailed configuration of the disparity compensating predictor 104 in a disparity extractor, 100-2 for example, of FIG. 1, comprising three pixel shifter 50 to 52 which recompose a predictive picture #2P by shifting Y, Cr and Cb components of pixels of the reference picture #1 onto every coordinates of each cluster according to the disparity vector for the cluster delivered from the disparity calculator 103.

Therefore, by setting appropriate initial values and repeating several times the processes in the segmentation circuit 101, the statistic information calculator 102, the disparity calculator 103 and the disparity compensating predictor 104 in each disparity extractor 100-2 to 100-n, (n−1) sets of disparity data #2D to #nD are obtained from a reference picture #1 and (n−1) input pictures #2 to #n, which enable to reproduce (n−1) predictive pictures #2P, to #nP sufficiently disparity compensated and are sufficiently smoothed to be compressed easily.

Now, other embodiments of the invention are described in the following paragraphs.

Figure 2:
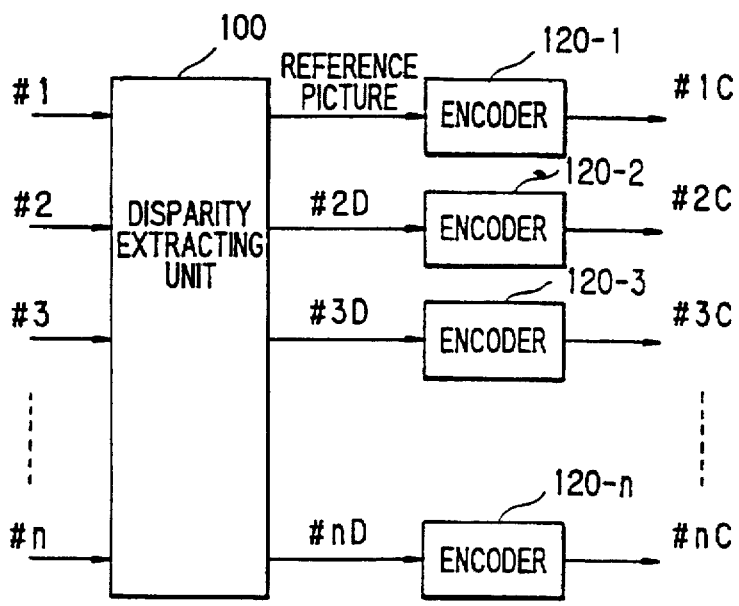
FIG. 2 is a block diagram illustrating a second embodiment of the invention.

FIG. 2 is a block diagram illustrating a second embodiment of the invention, further comprising n encoders 120-1 to 120-n in addition to the disparity extracting unit 100 of FIG. 1 for encoding and compressing the reference picture #1 and the (n−1) sets of disparity data #2D to #nD to be output as compressed codes #1C to #nC.

As for the n encoders 120-1 to 120-n, any conventional encoder developed for encoding ordinary two dimension pictures can be applied, as encoders prepared along the MPEG international standard or the ITU-T standard H.261 for example, each disparity vector of the (n−1) sets of disparity data #2D to #nD being one dimensional able to be encoded by the same algorithm with that applicable to ordinary two dimension pictures.

Figure 3:
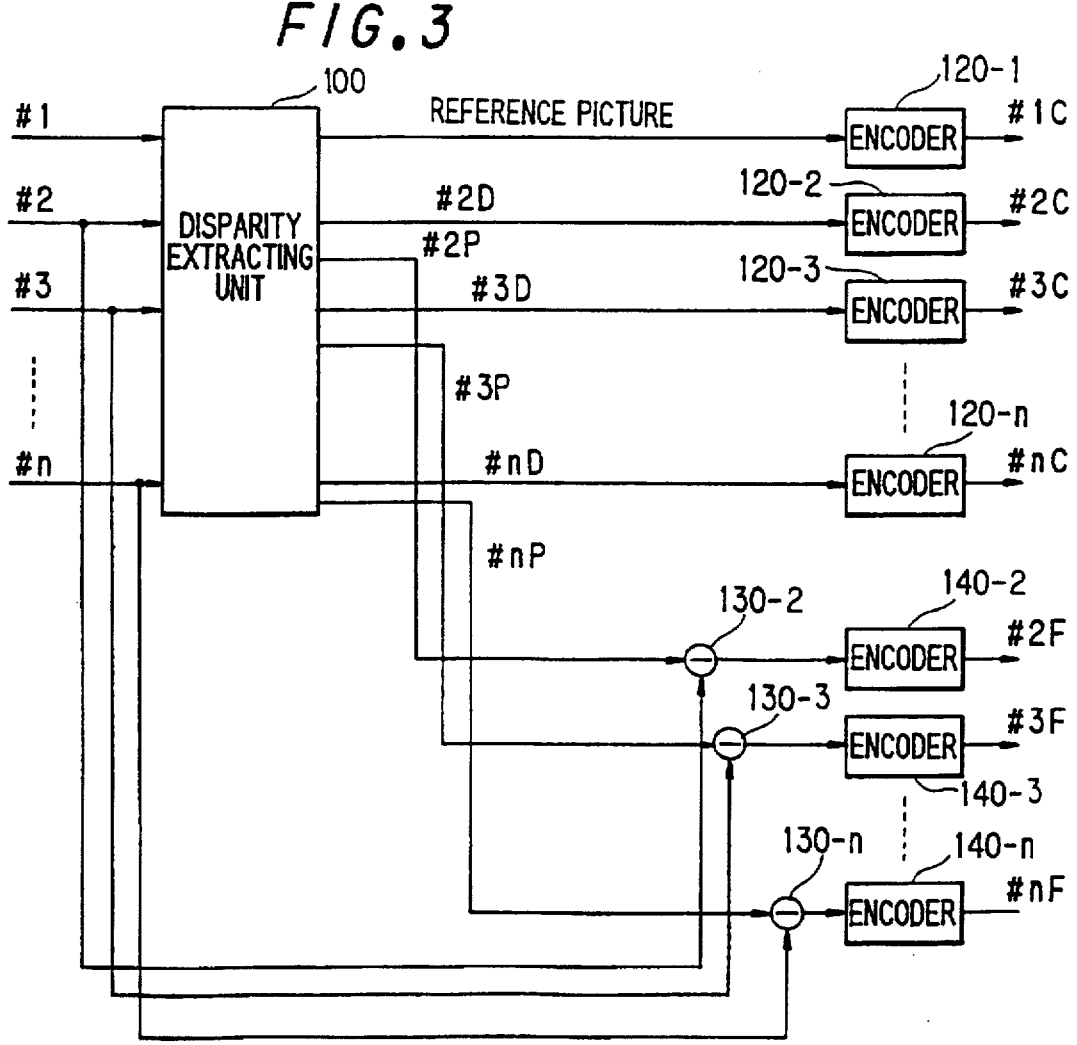
FIG. 3 is a block diagram illustrating a third embodiment of the invention.

FIG. 3 is a block diagram illustrating a third embodiment of the invention, further comprising (n−1) differentiator 130-2 to 130-n and (n−1) encoders 140-2 to 140-n, in addition to the second embodiments of FIG. 2.

Each of the differentiator 130-2 to 130-n outputs deferential data between the input pictures #2 to #n and the corresponding disparity compensated predictive pictures #2P to #nP finally output from the disparity compensating predictors 104 of the disparity extractors 100-2 to 100-n of FIG. 1, to be encoded and compressed into compressed differential #2F to #nF by the (n−1) encoders 140-2 to 140-n. As for the (n−1) encoders 140-2 to 140-n, any conventional encoder applicable to the (n−1) encorders 120-1 to 120-n can be applied.

Here in the second or the third embodiment, disparity vectors for all pixels must be encoded, because every pixel is possible to be a boundary of segments when a supple segmentation method is applied. Therefore code volume of disparity vectors may become enormous. On the other hand, when a solid segmentation method as the block matching is applied, only one disparity vector is sufficient to be encoded for a segment as boundaries of segments are fixed.

For the reason, the disparity extraction may be performed for each unit predetermined of pixels, having a form of a rectangle or a short line, for example, in order to suppress code volume for the disparity data.

By performing processes in the segmentation circuit 101, the statistic information calculator 102, the disparity calculator 103 and the disparity compensating predictor 104 of each of the disparity extractors 100-2 to 100-n for units of pixels predetermined, each code volume of the disparity data #2D to #nD can be reduced to 1/(number of pixels par unit), consequently suppressing code volumes of the compressed data #2C to #nC, with smaller increase of code volumes of the compressed differential #2F to #nF than the increase when the block matching is applied.

Figure 4:
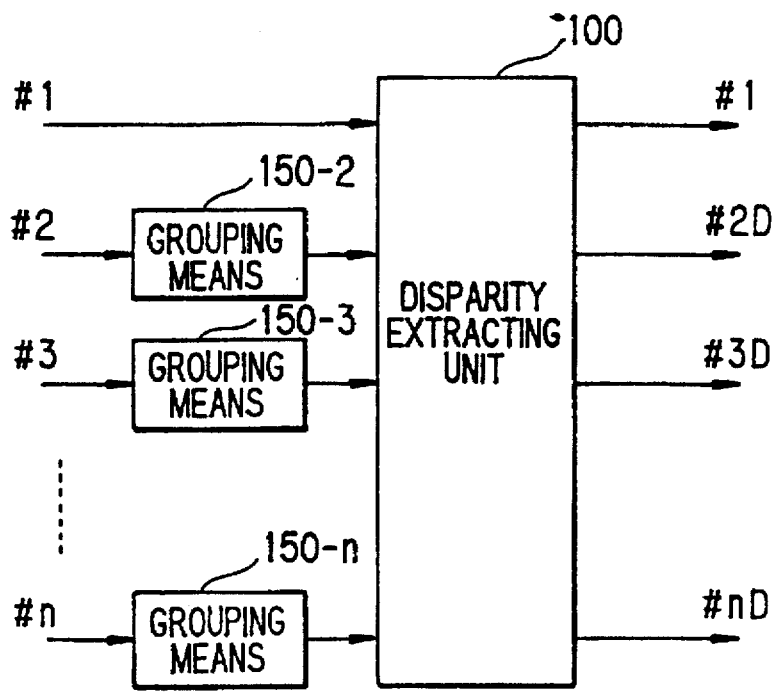
FIG. 4 is a block diagram illustration a fourth embodiment of the invention.

FIG. 4 is a block diagram illustrating a fourth embodiment of the invention further comprising grouping means 150-2 to 150-n, in addition to the first embodiment of FIG. 1, for grouping pixels of the input pictures #2 to #n into units, each having a form of a rectangular or a form of a short line, to be treated efficiently in the disparity extracting unit 100.

Figure 5:
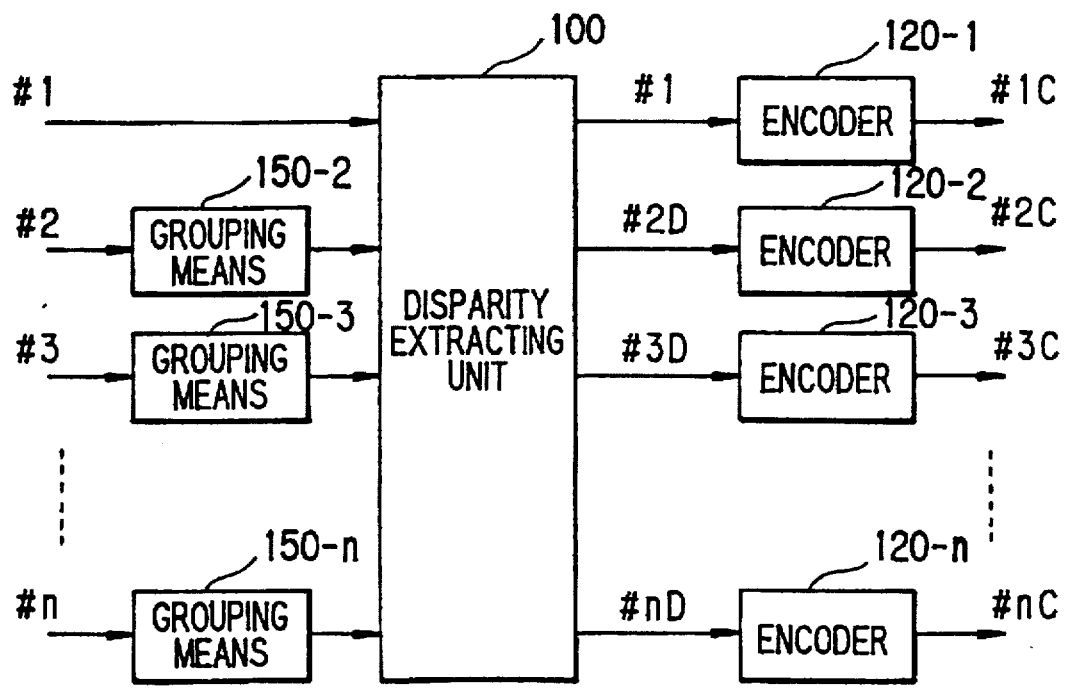
FIG. 5 is block diagram illustrating a fifth embodiment of the invention.
Figure 6:
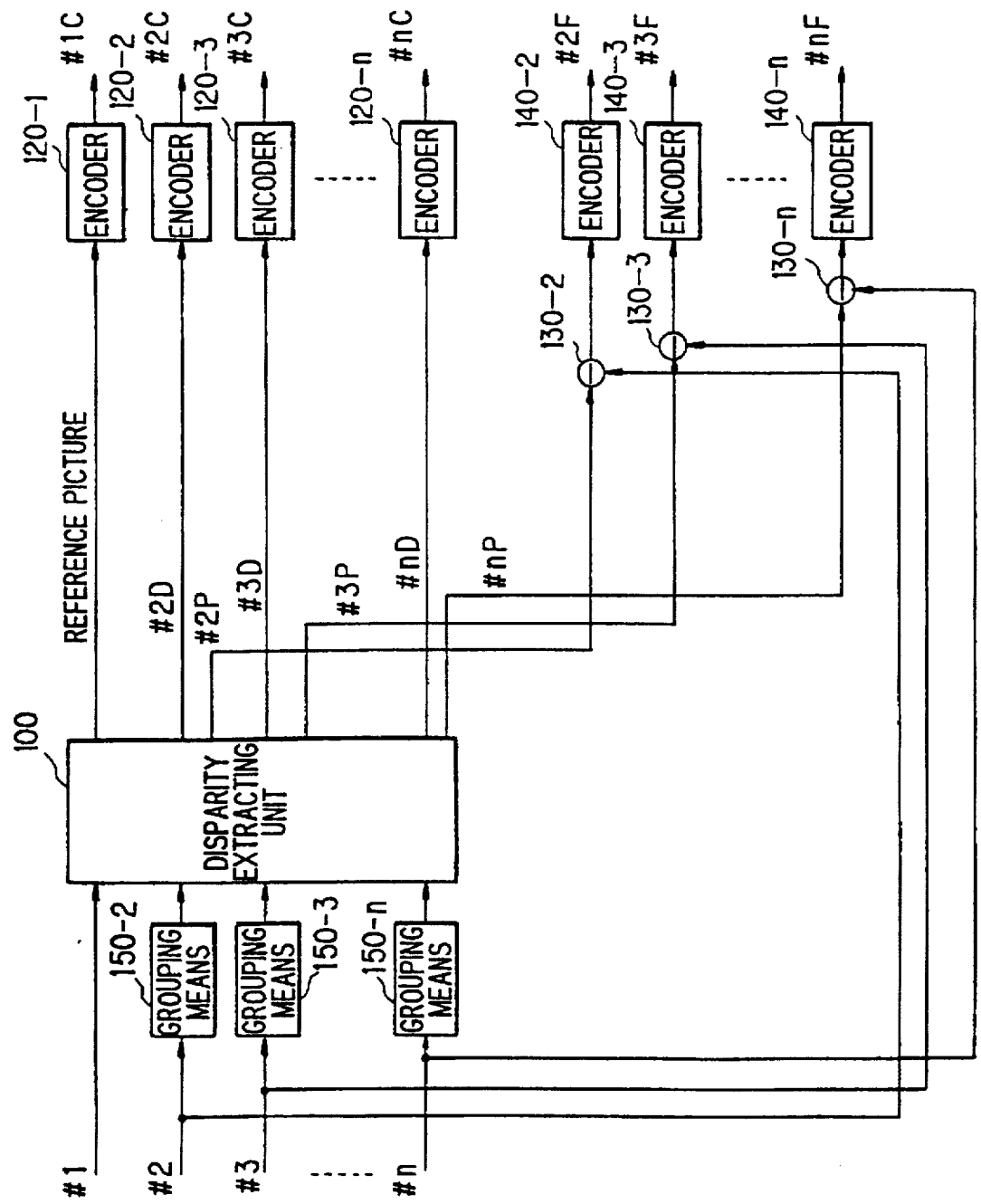
FIG. 6 is block diagram illustrating a sixth embodiment of the invention.

FIG. 5 and FIG. 6 are block diagrams each illustrating a fifth and a sixth embodiment of the invention respectively, further comprising grouping means 150-2 to 150-n, in addition to the second and the third embodiments of FIG. 2 and FIG. 3 respectively. The grouping means 150-2 to 150-n operate similarly in the fourth embodiment of FIG. 4 and duplicated descriptions are omitted.

In the following paragraphs, embodiments of the invention for clearness enhancement of stereo pictures will be described.

Figure 7:
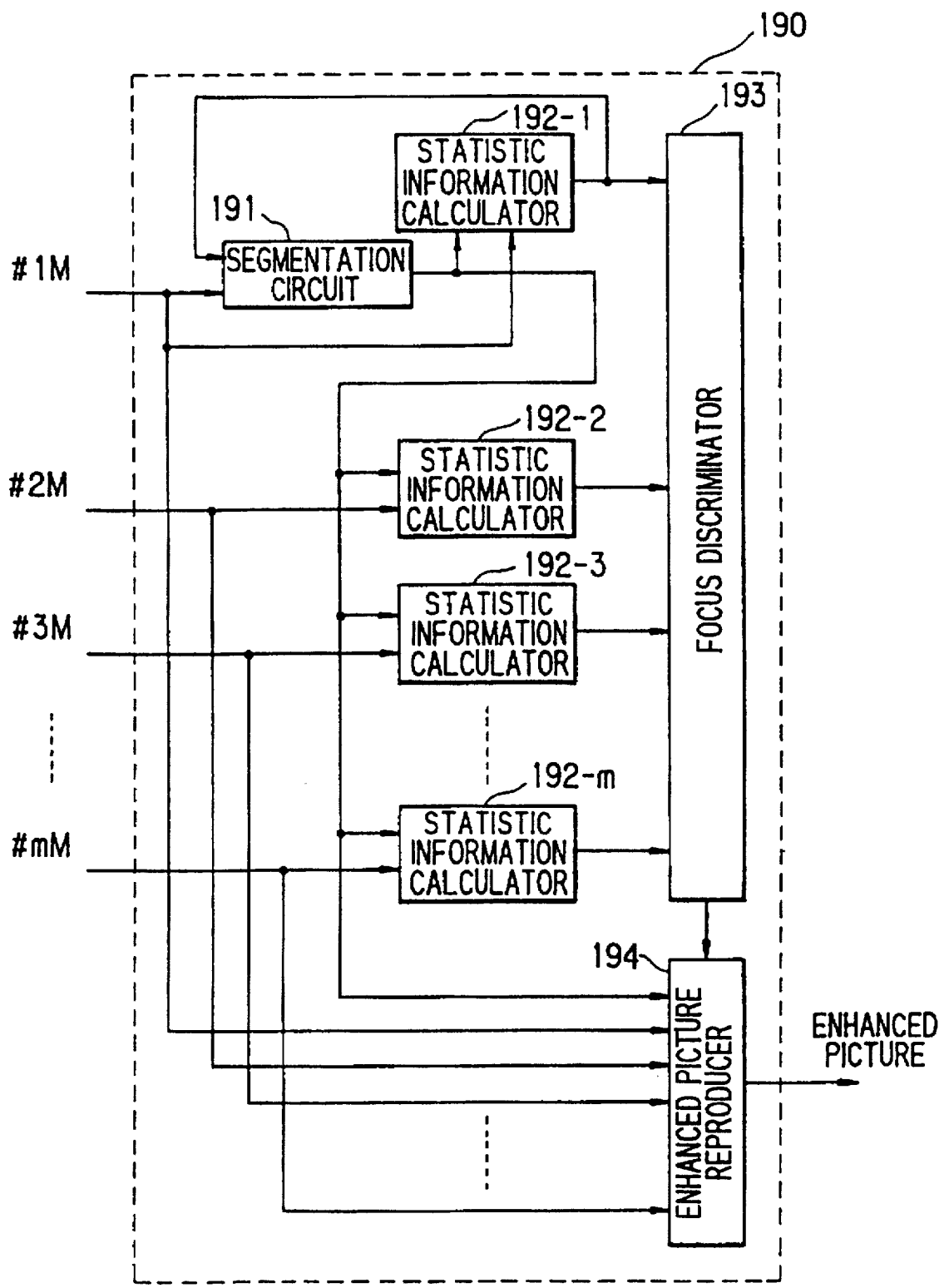
FIG. 7 is a block diagram illustrating a seventh embodiment of the invention for picture clearness enhancement.

FIG. 7 is a block diagram illustrating a seventh embodiment, a picture enhancer 190, of the invention, comprising a segmentation circuit 191, m statistic information calculators 192-1 to 192-m, a focus discriminator 193 and an enhanced picture reproducer 194.

The segmentation circuit 191 performs segmentation of one, an input picture #1M for example, of m input pictures #1M to #mM each differently focused with each other, making use of a clustering method with distance data calculated according to the equation (1) from pixel values of the input picture #1M, statistic information delivered from the statistic information calculator 192-1.

Each of the m statistic information calculators 192-1 to 192-m, 192-1 for example, calculates statistic information for each segment as an average and dispersion of pixel values, a center of gravity (only as for the statistic information calculator 192-1), etc., from the pixel values of a corresponding input picture #1M, for example, and segmentation data delivered from the segmentation circuit 191.

For each segment determined by the segmentation circuit 191, the focus discriminator 193 selects one of the m input pictures #1M to #mM which gives a highest value of clearness $c_n$ for the segment, calculating the clearness $c_n$ according to the equation (4) with statistic information concerning to the m input pictures #1M to #mM delivered from the statistic information calculators 192-1 to 192-m.

And, the enhanced picture reproducer 194 reproduces a clearness enhanced picture with segments of the input pictures each selected by the focus discriminator 193 for each of the clusters referring to segmentation data delivered from the segmentation circuit 191.

In the processes above described, processes in the segmentation circuit 191 and the statistic information circuit 192-1, which calculates statistic information of an input picture, #1M in the example, to be segmented by the segmentation circuit 191, are repeated several times for converging the segmentation data sufficiently.

Figure 21:
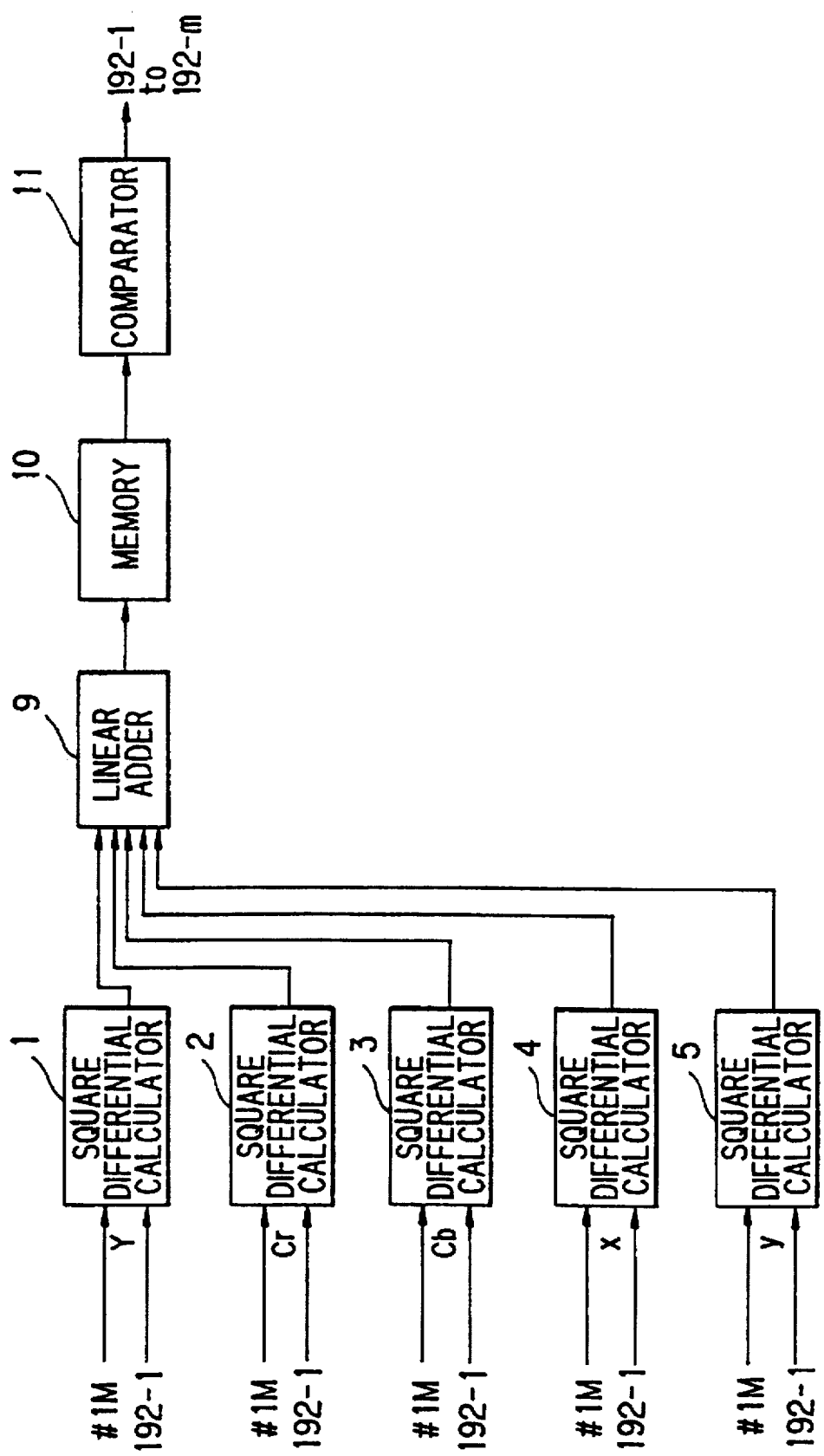
FIG. 21 is a block diagram illustrating an example of a detailed configuration of the segmentation circuit 191 of FIG. 7.

FIG. 21 is a block diagram illustrating an example of a detailed configuration of the segmentation circuit 191 of FIG. 7, comprising five square differential calculators 1 to 5, a linear adder 9, a memory 10 and a comparator 11.

The square differential calculator 1 calculates a square of differential between Y color component of each pixel of the input picture #1M, for example, and each average of those of clusters around the pixel delivered from the statistic information calculator 192-1, while the square differential calculators 2 and 3 calculate the same of Cr and Cb components respectively. Similarly, the square differential calculators 4 and 5 calculate the same of x ad y components respectively.

The linear adder 9 performs a linear summation to be stored in the memory 10 with the outputs of the square differential calculators 1 to 5 according to the equation (4).

The comparator 11 compares, for each pixel, the linear summations thus stored in the memory 10 for every clusters around the pixel, and selects a cluster which gives a minimum value among the linear summations for each pixel, for outputting index of the cluster as the segmentation data for the pixel.

The statistic information calculators 192-1 to 192-m have the same configuration with the statistic information calculator 102 of FIG. 18 and operate the same, and so duplicated descriptions are omitted.

Figure 22:
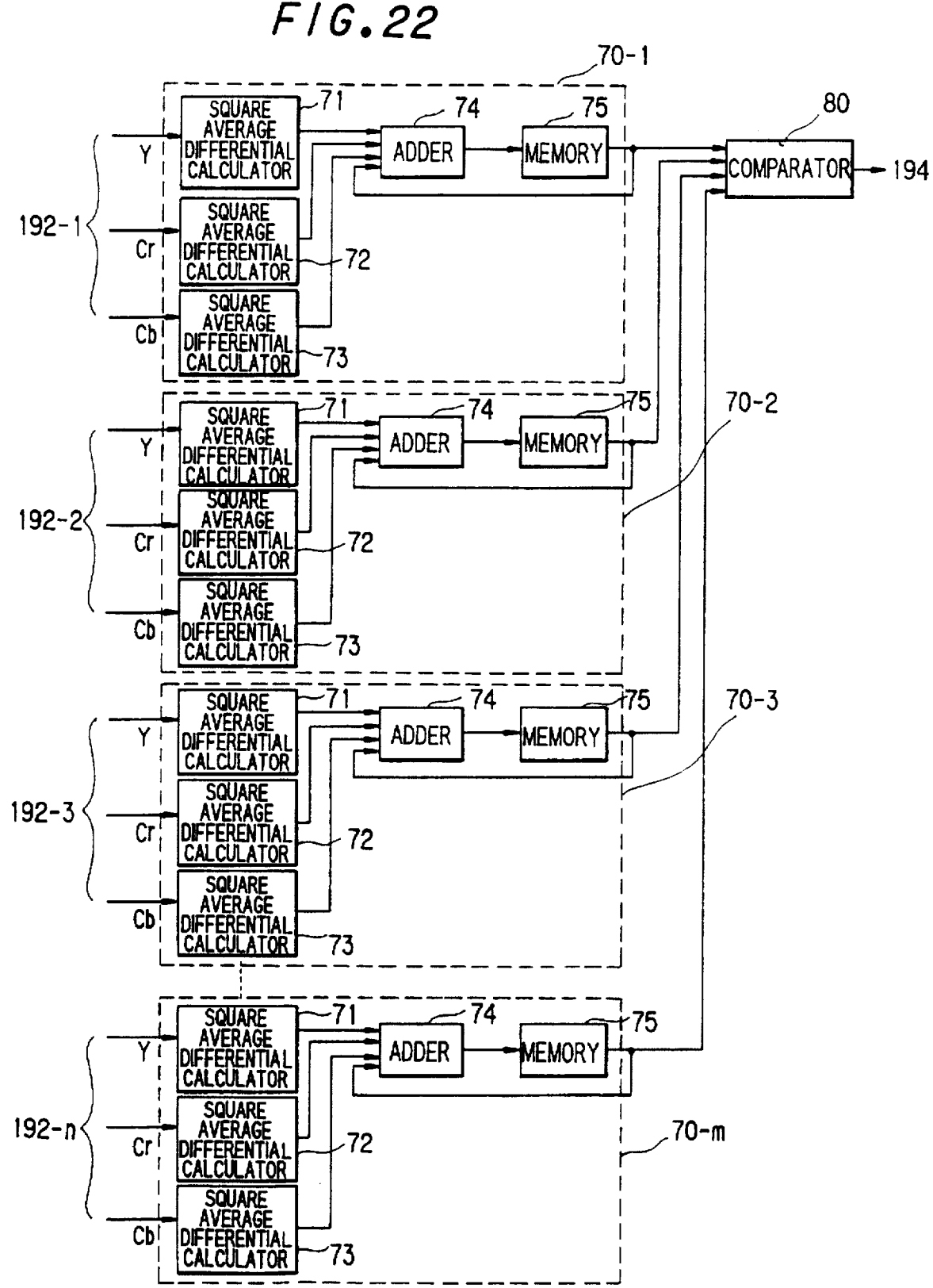
FIG. 22 is a block diagram illustrating the focus discriminator 193 of FIG. 7.

FIG. 22 is a block diagram illustrating the focus discriminator 193 of FIG. 7, having m clearness calculator 70-1 to 70-m and a comparator 80.

Each of the clearness calculator 70-1 to 70-m comprises;

three square average differential calculators 71 to 73 for calculating squares of difference between averages of Y, Cr and Cb components, respectively, of pixels in a concerning cluster and those in one of clusters around the concerning clusters with data delivered from each of the statistic information calculators 192-1 to 192-m; and an adder 74 for adding outputs of the three square average differential calculators 71 to 73 with corresponding accumulated value stored in a memory 75 for each cluster, which is restored in the memory 75 after addition.

The comparator 80 compares the accumulated value for the concerning cluster stored in the memory 75 of each clearness calculators 70-1 to 70-m with each other to discriminate a most focused picture for the concerning cluster for outputting index thereof.

Thus, a clearness enhanced picture is obtained from m input pictures each focused differently from each other, by the picture enhancer 190 of the invention.

Figure 16:
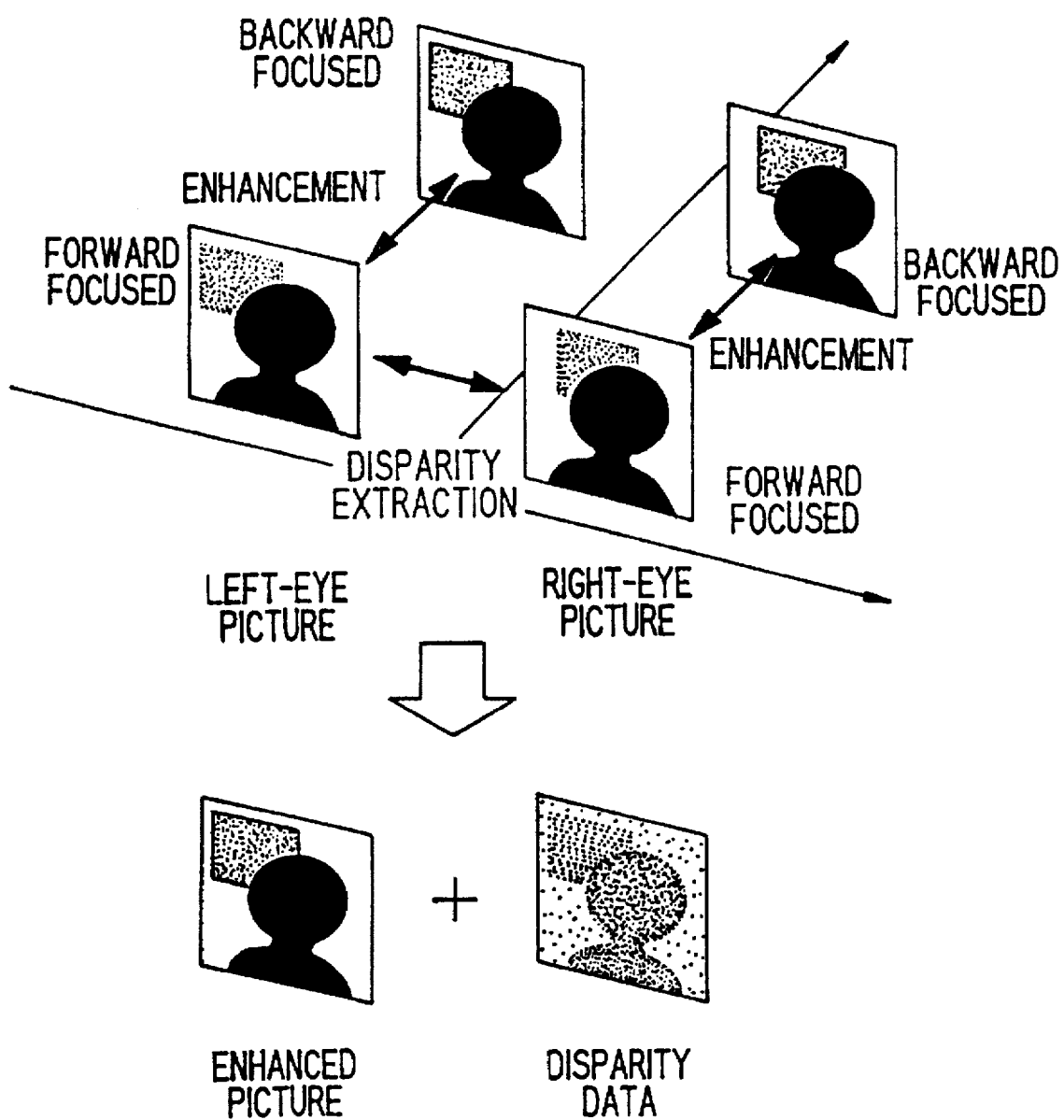
FIG. 16 illustrates a concept of a stereo enhanced picture coding.

FIG. 16 illustrates a concept of a stereo enhanced picture coding, wherein intra-coded data of a clearness enhanced reference picture and disparity data for representing (n-1) enhanced predictive pictures are prepared, from n sets with different disparities of m pictures differently focused.

Figure 8:
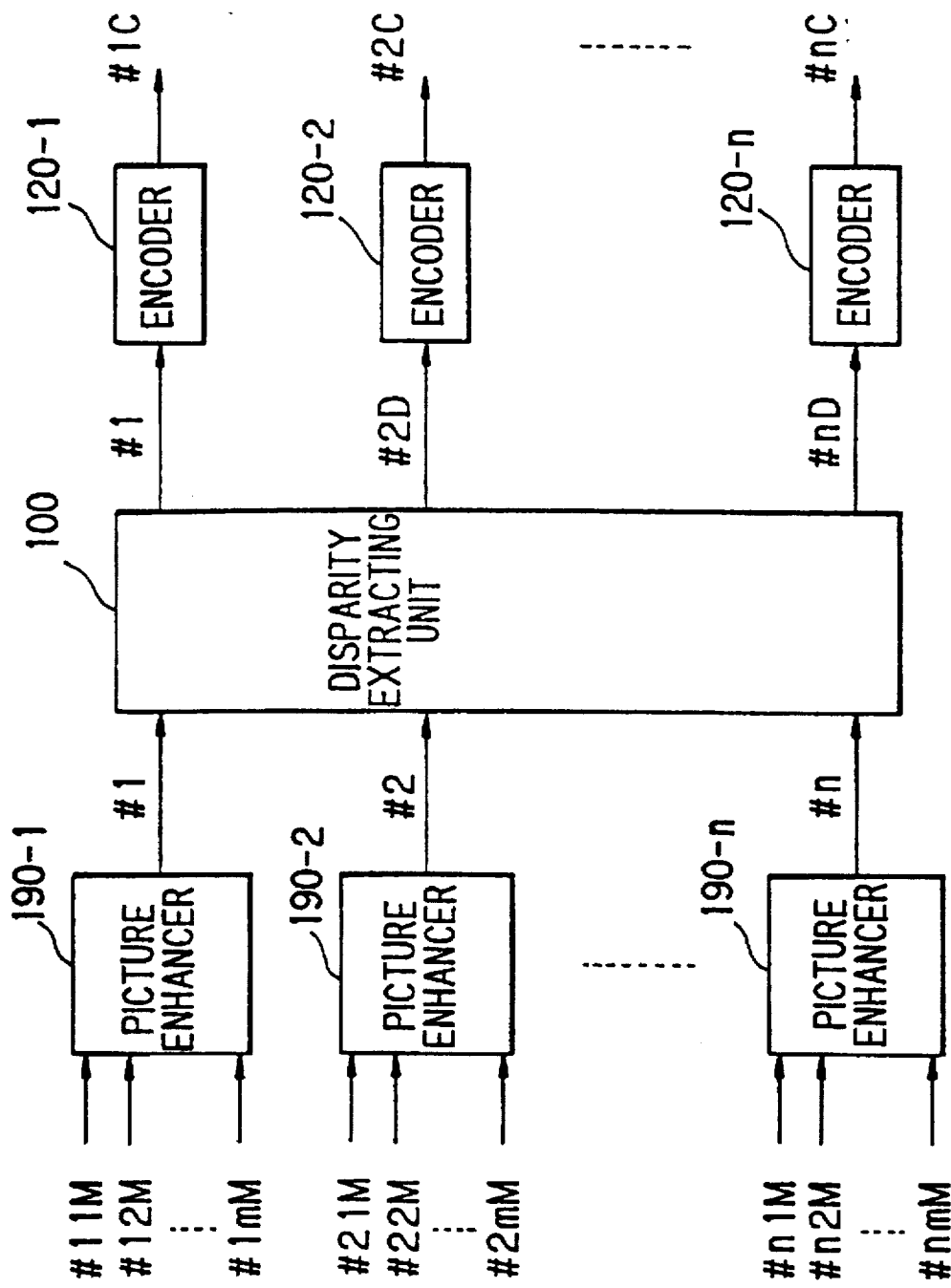
FIG. 8 is a block diagram illustrating an eighth embodiment of the invention.

FIG. 8 is a block diagram illustrating a eighth embodiment of the invention, comprising;

n picture enhancers 190-1 to 190-n each having the same configuration with the picture enhancer 190 of FIG. 7 for reproducing n input pictures #1 to #n from n sets having different disparities of m pictures differently focused, a disparity extracting unit 100 of FIG. 1 for generating a reference picture #1 and (n-1) sets of disparity data #2D to #nD from the n input pictures #1 to #n, and n encoders 120-1 to 120-n of FIG. 2.

The embodiment operates the same with the second embodiment of FIG. 2 for n clearness enhanced pictures, each obtained in the same way with the seventh embodiment of FIG. 7, duplicated descriptions omitted.

In the same concept, other several embodiments can be provided in the scope of the invention, as follows.

Figure 9:
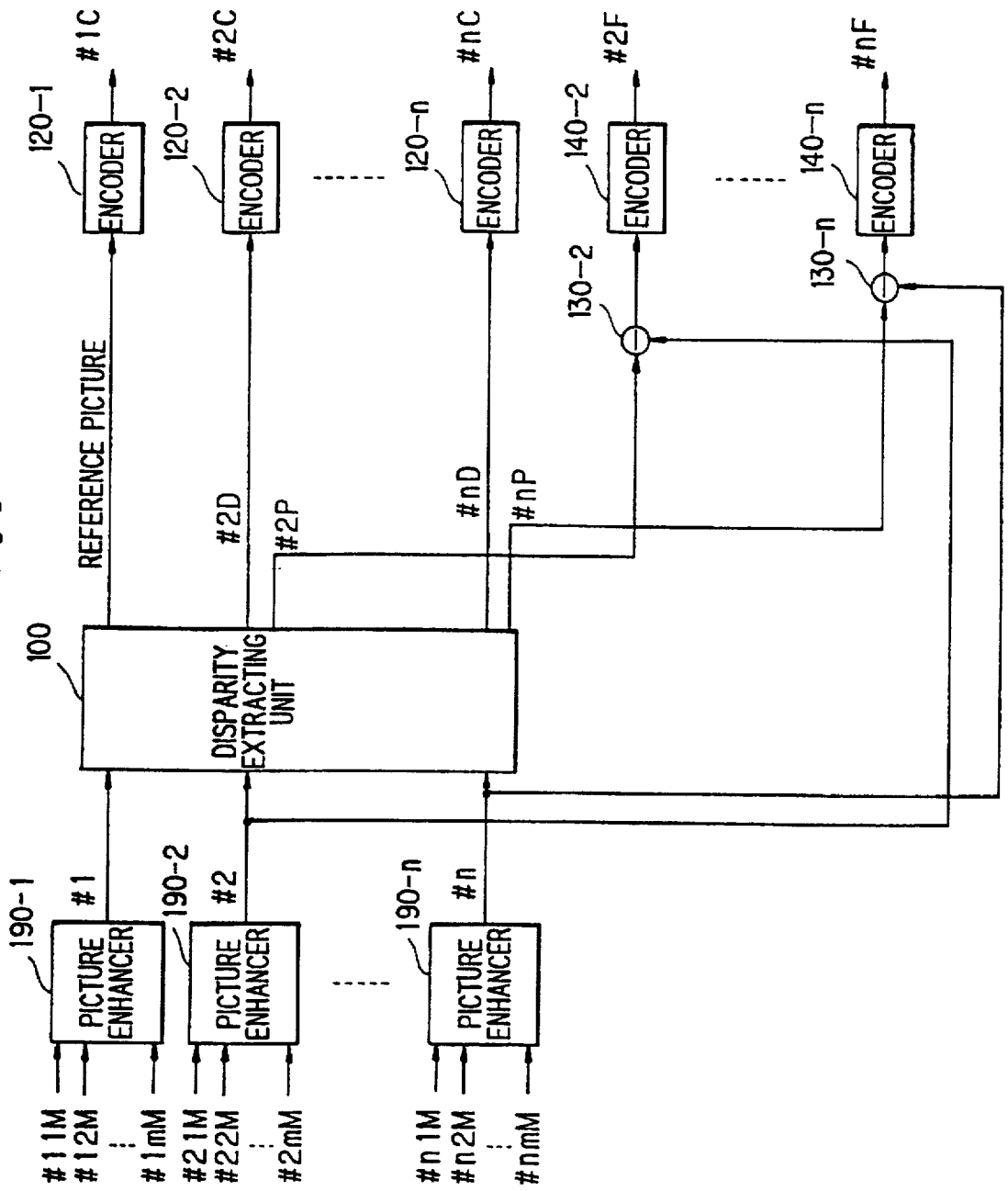
FIG. 9 is a block diagram illustrating a ninth embodiment of the invention.

FIG. 9 is a block diagram illustrating a ninth embodiment of the invention further comprising n picture enhancers 190-1 to 190-n each having the same configuration with the picture enhancer 190 of FIG. 7 for reproducing n input pictures #1 to #n from n sets having different disparities of m pictures differently focused, in addition to the third embodiment of FIG. 3, applied in case disparity pictures are to be represented exactly.

Figure 10:
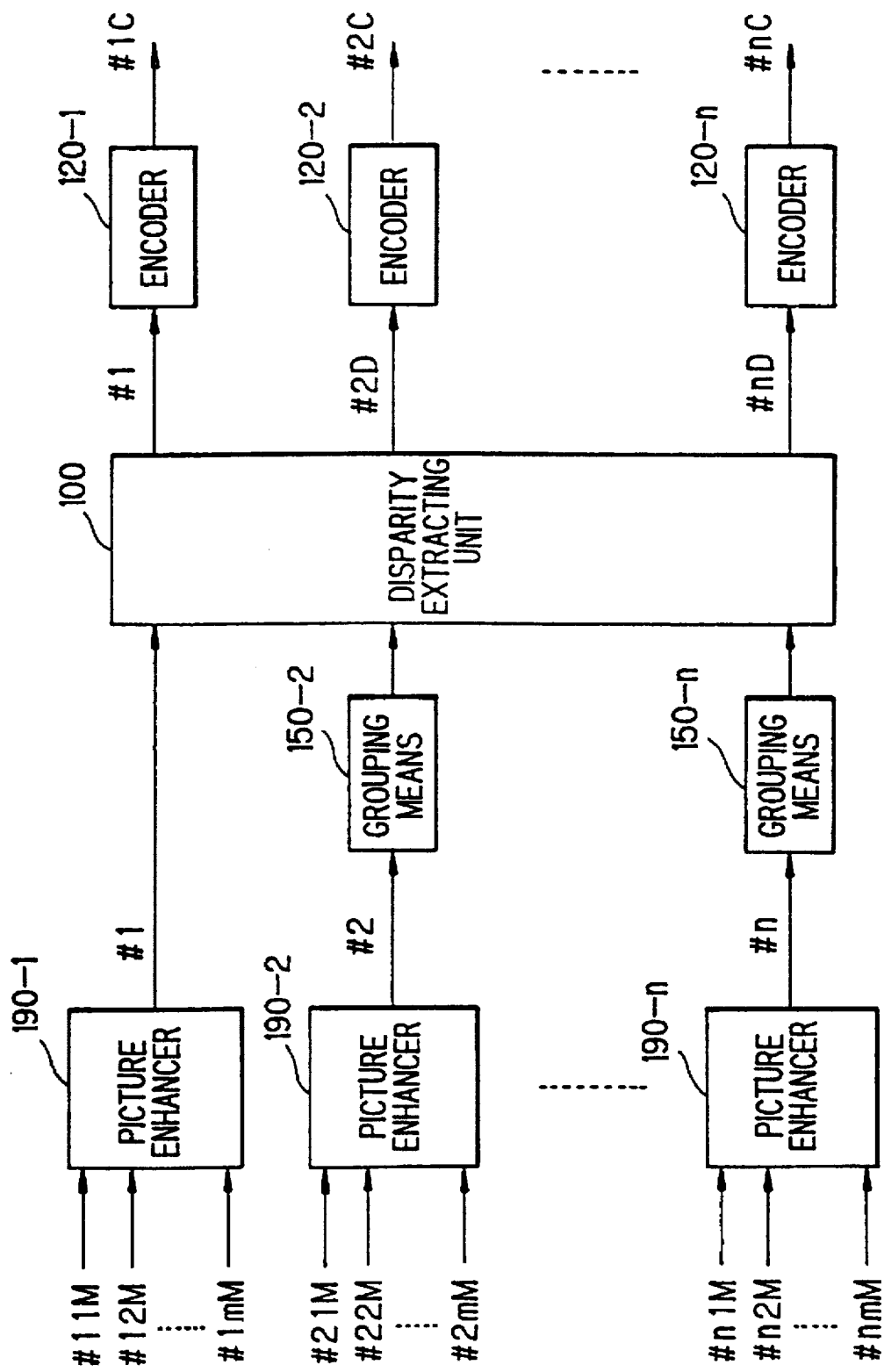
FIG. 10 is a block diagram illustrating a tenth embodiment of the invention.

FIG. 10 is a block diagram illustrating a tenth embodiment of the invention further comprising n picture enhancers 190-1 to 190-n each having the same configuration with the picture enhancer 190 of FIG. 7, in addition to the fifth embodiment of FIG. 5, applied in case coding volume is to be suppressed.

Figure 11:
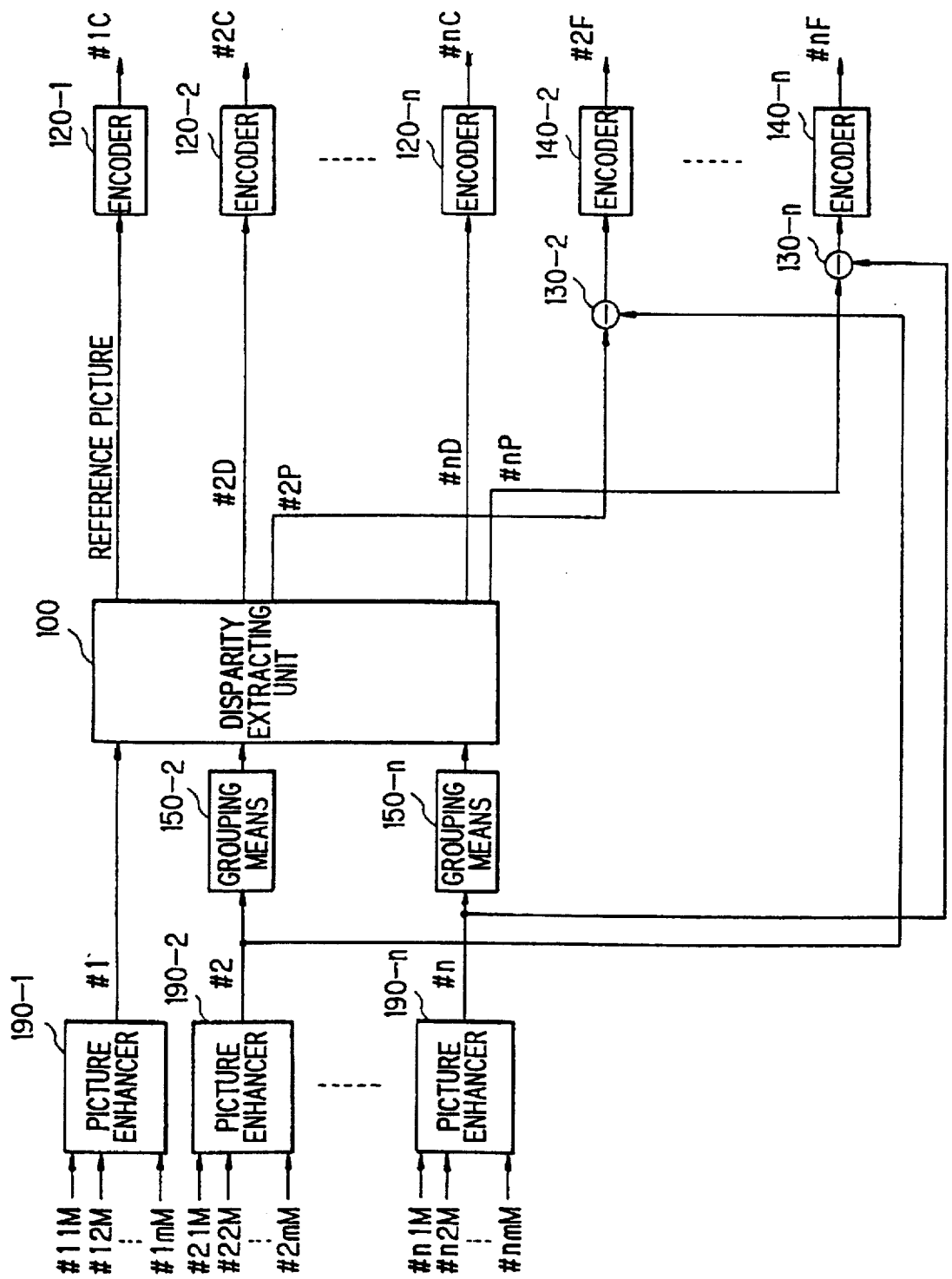
FIG. 11 is a block diagram illustrating an eleventh embodiment of the invention.

FIG. 11 is a block diagram illustrating a eleventh embodiment of the invention further comprising n picture enhancers 190-1 to 190-n each having the same configuration with the picture enhancer 190 of FIG. 7, in addition to the sixth embodiment of FIG. 6, applied in case disparity pictures are to be represented with a certain exactitude.

Now, embodiments concerning decoding of the three dimension picture coding system of the present invention will be described.

Figure 12:
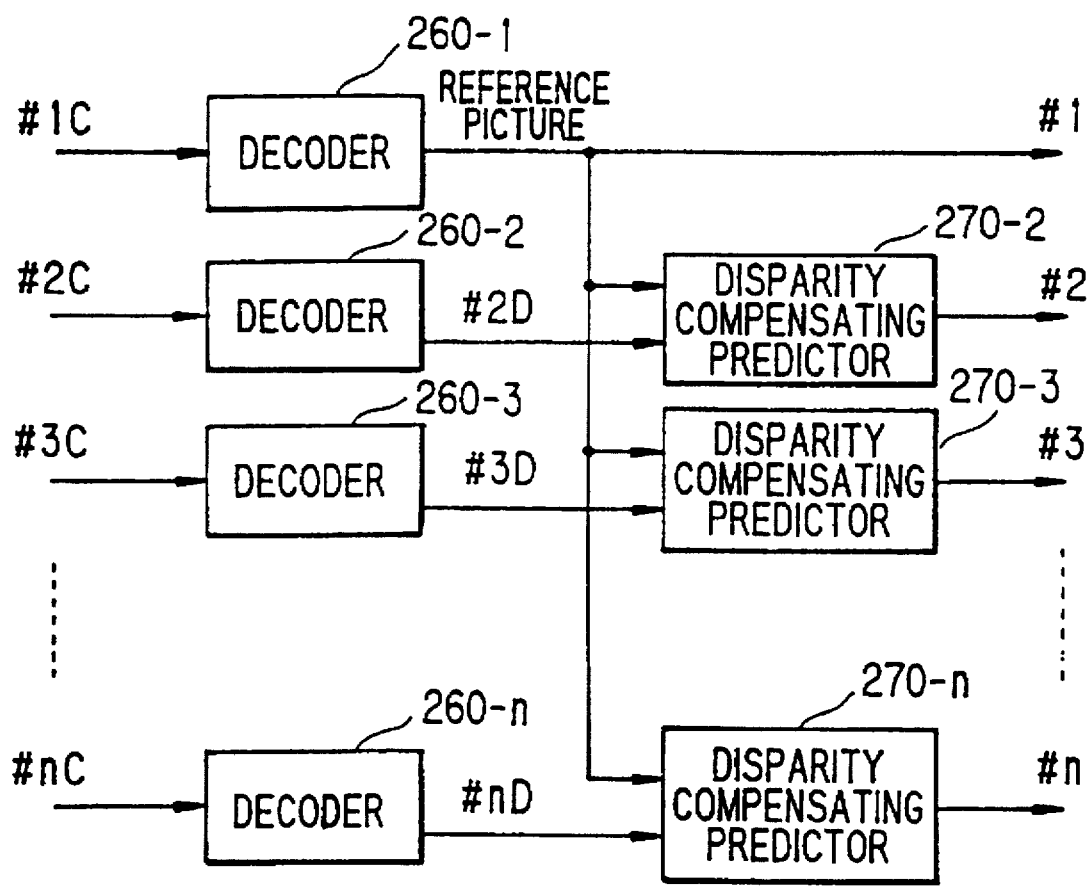
FIG. 12 is a block diagram illustrating a twelfth embodiment of the invention.

FIG. 12 is a block diagram illustrating a twelfth embodiment of the invention for decoding compressed code data generated by the second, fifth, eighth or tenth embodiment, comprising;

n decoders 260-1 to 260-n for decoding the compressed codes #1C to #nC generated by encoders 120-1 to 120-n into a reference picture #1 and disparity data #2D to #nD, (n-1) disparity compensating predictors 270-2 to 270-n for representing (n-1) disparity compensated predictive pictures #2P to #nP from the reference picture #1 and the disparity data #2D to #nD.

As for the n decoders 260-1 to 260-n, any conventional decoder corresponding to the encoders applied in the second, fifth, eighth or tenth embodiment can be applied, as decoders prepared along the MPEG international standard or the ITU-T standard H.261 for example, each disparity vector of the (n-1) sets of disparity data #2D to #nD being one dimensional able to be encoded by the same algorithm with that applicable to ordinary two dimension pictures.

And, as for the disparity compensating predictors 270-2 to 270-n, a disparity compensating predictor 104 of FIG. 20 can be applied, for example.

It should be noted here that directly with the reference picture #1 and the disparity compensated predictive pictures #2P to #nP, a stereo view may be represented with a sufficient reality, since a fairy natural segmentation is performed in the invention as beforehand described.

Figure 13:
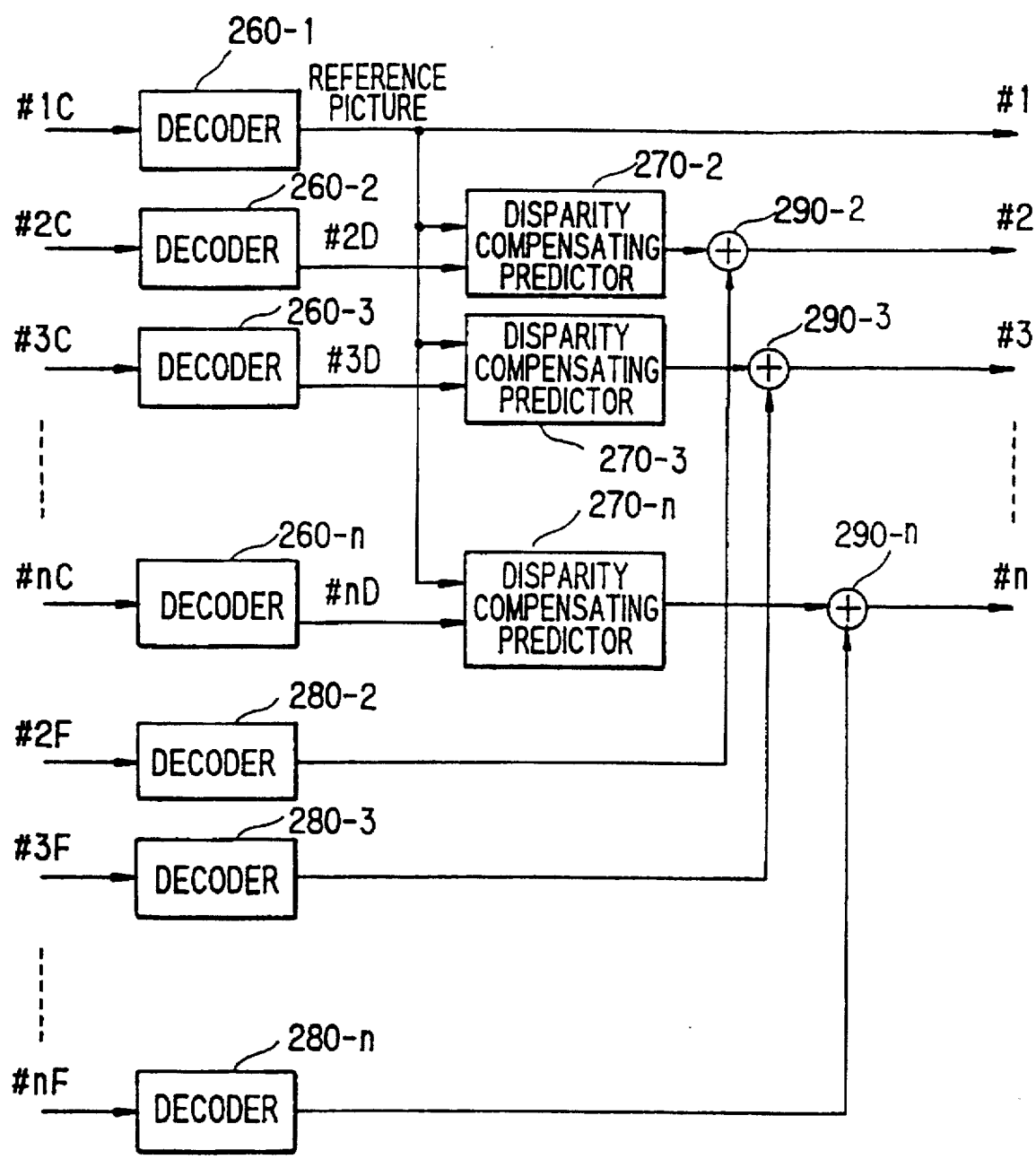
FIG. 13 is a block diagram illustrating a thirteenth embodiment of the invention.
Figure 14:
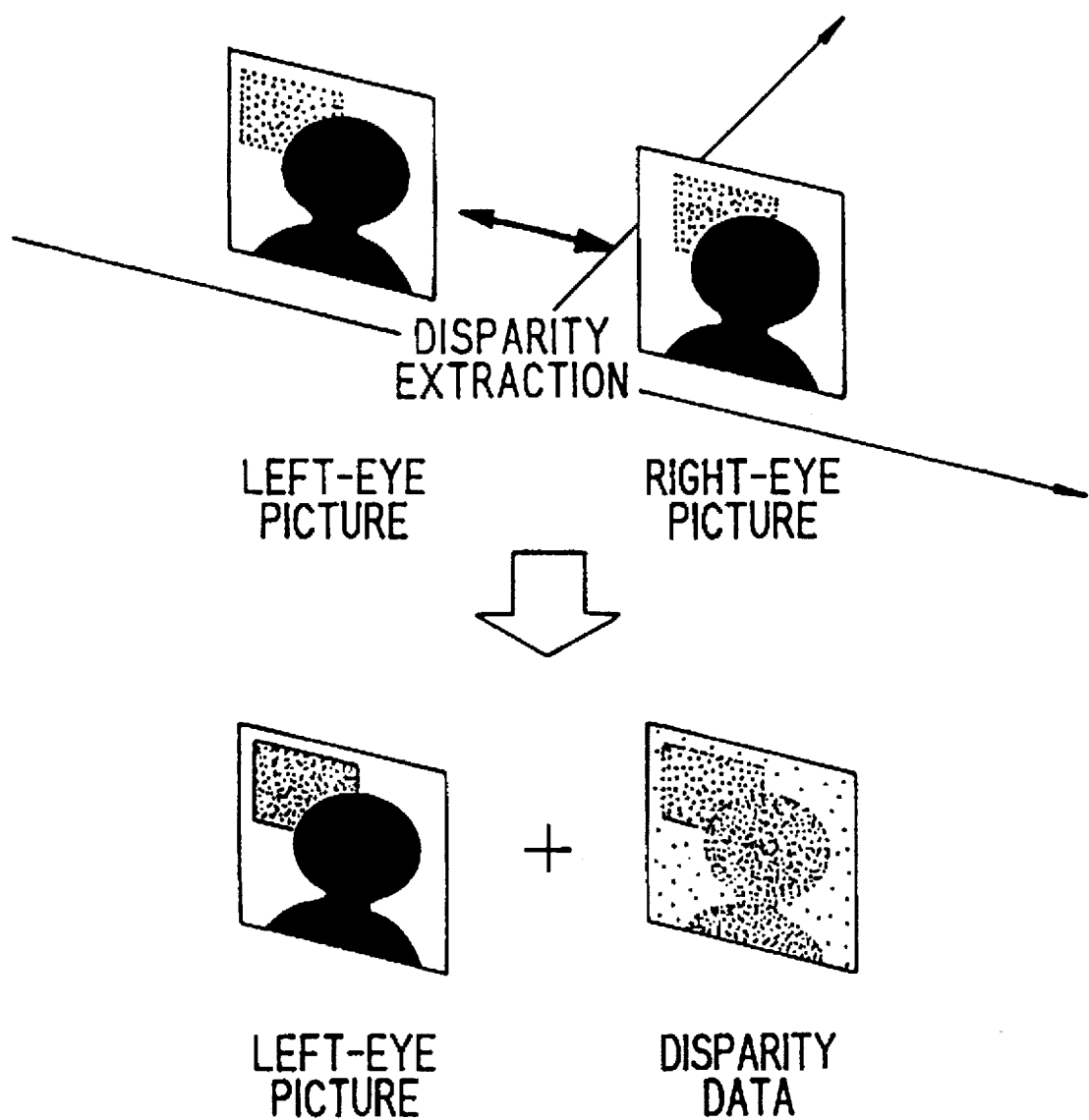
FIG. 14 illustrates concept of disparity extraction of stereo pictures.

FIG. 13 is a block diagram illustrating a thirteenth embodiment of the invention, further comprising in addition to the twelfth embodiment of FIG. 12;

(n−1) decoders 280-2 to 280-n for decoding the compressed differential #2F to #nF generated by encoders 140-2 to 140-n into differential data to be added by adders 290-2 to 290-n onto the disparity compensated predictive pictures #2P to #nP for exactly reproducing input pictures #2 to #n.

Thus, the reference picture #1 and the input pictures #2 to #n, clearness enhanced or not, are reproduced, providing a stereo view having a sharply improved reality and robustness with a code volume sufficiently suppressed.

What is claimed is:

1. A disparity extracting unit having at least one disparity extractor, each of said at least one disparity extractor comprising a segmentation circuit, a statistic information calculator, a disparity calculator and a disparity compensating predictor; wherein:

said segmentation circuit performs segmentation of an input picture having disparity to a reference picture, by clustering each pixel of said input picture into one of segments whereof initial coordinates are predetermined, referring to distance data calculated from pixel values of said each pixel, statistic information delivered from said statistic information calculator, and pixel values, corresponding to said each pixel, of a disparity compensated predictive picture generated by said disparity compensating predictor;

said statistic information calculator calculates, for every of said segments, said statistic information including an average and dispersion of color components of pixels clustered into each of said segments and a center of gravity of said each of said segments, from said pixel values of said each pixel and segmentation data for said each pixel delivered from said segmentation circuit;

said disparity calculator calculates a disparity vector of a horizontal dimension, for each of said segments, which minimizes differential values between said input picture and said disparity compensated predictive picture, from pixel values of said reference picture, pixel values of said input picture, and said segmentation data delivered from said segmentation circuit; and said disparity compensating predictor generates said disparity compensated predictive picture for said input picture from pixel values of said reference picture, and disparity vectors supplied from said disparity calculator.

2. A three dimension picture coding system having at least one disparity extractor and at least two encoders, each of said at least one disparity extractor comprising a segmentation circuit, a statistic information calculator, a disparity calculator and a disparity compensating predictor; wherein:

said segmentation circuit performs segmentation of an input picture having disparity to a reference picture, by clustering each pixel of said input picture into one of segments whereof initial coordinates are predetermined, referring to distance data calculated from pixel values of said each pixel, statistic information delivered from said statistic information calculator, and pixel values, corresponding to said each pixel, of a disparity compensated predictive picture generated by said disparity compensating predictor;

said statistic information calculator calculates, for every of said segments, said statistic information including an average and dispersion of color components of pixels clustered into each of said segments and a center of gravity of said each of said segments, from said pixel values of said each pixel and segmentation data for said each pixel delivered from said segmentation circuit;

said disparity calculator calculates a disparity vector of a horizontal dimension, for each of said segments, which minimizes differential values between said input picture and said disparity compensated predictive picture, from pixel values of said reference picture, pixel values of said input picture, and said segmentation data delivered from said segmentation circuit;

said disparity compensating predictor generates said disparity compensated predictive picture for said input picture from pixel values of said reference picture, and disparity vectors supplied from said disparity calculator;

one of said at least two encoders encodes said reference picture; and each of the others of said at least two encoders encodes disparity vectors finally supplied from said disparity calculator of each of said at least one disparity extractor.

3. A three dimensional picture coding system recited in claim 2, further comprising:

at least one differentiator, each of said at least one differentiator outputting differential data between said reference picture and said disparity compensated predictive picture finally generated by said disparity compensating predictor of each of said at least one disparity extractor; and at least one encoder, each of said at least one encoder encoding said differential data output from each of said at least one differentiator.

4. A three dimension picture coding system recited in claim 2, further comprising at least two picture enhancers:

one of said at least two picture enhancer outputting an enhanced picture to be used for said reference picture; and each of the others of said at least two picture enhancer outputting an enhanced picture used for said input picture for each of said at least one disparity extractor.

5. A three dimension picture coding system recited in claim 2, further comprising:

a first decoder for decoding output of said one of said at least two encoders for generating a reference picture;

at least one second decoder, each of said at least one second decoder decoding output of said each of the other of said at least two encoders for generating disparity data; and at least one disparity compensating predictors, each of said at least one disparity compensating predictors representing a disparity compensated predictive picture from said reference picture and said disparity data generated by each of said at least one second decoder.

6. A three dimension picture coding system recited in claim 3, further comprising at least two picture enhancers:

one of said at least two picture enhancer outputting an enhanced picture to be used for said reference picture; and each of the others of said at least two picture enhancer outputting an enhanced picture used for said input picture for each of said at least one disparity extractor.

7. A three dimension picture coding system recited in claim 6, further comprising:

a first decoder for decoding output of said one of said at least two encoders for generating a reference picture;

at least one second decoder, each of said at least one second decoder decoding output of said each of the other of said at least two encoders for generating disparity data;

at least one disparity compensating predictors, each of said at least one disparity compensating predictors representing a disparity compensated predictive picture from said reference picture and said disparity data generated by each of said at least one second decoder;

at least one third decoder, each of said at least one third decoder decoding output of each of said at least one encoder; and at least one adder, each of said at least one adder adding output of each of said at least one third decoder with output of corresponding each of said at least one disparity compensating predictors.

8. A three dimension picture coding system recited in claim 3, further comprising:

a first decoder for decoding output of said one of said at least two encoders for generating a reference picture;

at least one second decoder, each of said at least one second decoder decoding output of said each of the other of said at least two encoders for generating disparity data;

at least one disparity compensating predictors, each of said at least one disparity compensating predictors representing a disparity compensated predictive picture from said reference picture and said disparity data generated by each of said at least one second decoder;

at least one third decoder, each of said at least one third decoder decoding output of each of said at least one encoder; and at least one adder, each of said at least one adder adding output of each of said at least one third decoder with output of corresponding each of said at least one disparity compensating predictors.

9. A three dimension picture coding system recited in claim 4, further comprising:

a first decoder for decoding output of said one of said at least two encoders for generating a reference picture;

at least one second decoder, each of said at least one second decoder decoding output of said each of the other of said at least two encoders for generating disparity data; and at least one disparity compensating predictors, each of said at least one disparity compensating predictors representing a disparity compensated predictive picture from said reference picture and said disparity data generated by each of said at least one second decoder.

10. A disparity extracting unit having at least one disparity extractor, each of said at least one disparity extractor comprising grouping means, a segmentation circuit, a statistic information calculator, a disparity calculator and a disparity compensating predictor; wherein:

said grouping means group pixels of an input picture having disparity to a reference picture into units, each of said units having a form of rectangle including a form of a short line;

said segmentation circuit performs segmentation of said input picture, by clustering each of said units of said input picture into one of segments whereof initial coordinates are predetermined, referring to distance data calculated from pixel values of said each of said units, statistic information delivered from said statistic information calculator, and pixel values, corresponding to said each of said units, of a disparity compensated predictive picture generated by said disparity compensating predictor;

said statistic information calculator calculates, for every of said segments, said statistic information including an average and dispersion of color components of pixels of said units clustered into each of said segments and a center of gravity of said each of said segments, from said pixel values of said each of said units and segmentation data for said each of said units delivered from said segmentation circuit;

said disparity calculator calculates a disparity vector of a horizontal dimension, for each of said segments, which minimizes differential values between said input picture and said disparity compensated predictive picture, from pixel values of said reference picture, pixel values of said input picture, and said segmentation data delivered from said segmentation circuit; and said disparity compensating predictor generates said disparity compensated predictive picture for said input picture from pixel values of said reference picture, and disparity vectors supplied from said disparity calculator.

11. A three dimension picture coding system having at least one disparity extractor and at least two encoders, each of said at least one disparity extractor comprising grouping means, a segmentation circuit, a statistic information calculator, a disparity calculator and a disparity compensating predictor; wherein:

said grouping means group pixels of an input picture having disparity to a reference picture into units, each of said units having a form of rectangle including a form of a short line;

said segmentation circuit performs segmentation of said input picture, by clustering each of said units of said input picture into one of segments whereof initial coordinates are predetermined, referring to distance data calculated from pixel values of said each of said units, statistic information delivered from said statistic information calculator, and pixel values, corresponding to said each of said units, of a disparity compensated predictive picture generated by said disparity compensating predictor;

said statistic information calculator calculates, for every of said segments, said statistic information including an average and dispersion of color components of pixels of said units clustered into each of said segments and a center of gravity of said each of said segments, from said pixel values of said each of said units and segmentation data for said each of said units delivered from said segmentation circuit;

said disparity calculator calculates a disparity vector of a horizontal dimension, for each of said segments, which minimizes differential values between said input picture and said disparity compensated predictive picture, from pixel values of said reference picture, pixel values of said input picture, and said segmentation data delivered from said segmentation circuit;

said disparity compensating predictor generates said disparity compensated predictive picture for said input picture from pixel values of said reference picture, and disparity vectors supplied from said disparity calculator;

one of said at least two encoders encodes said reference picture; and each of the others of said at least two encoders encodes disparity vectors finally supplied from said disparity calculator of each of said at least one disparity extractor.

12. A three dimension picture coding system recited in claim 11, further comprising:

at least one differentiator, each of said at least one differentiator outputting differential data between said reference picture and said disparity compensated predictive picture finally generated by said disparity compensating predictor of each of said at least one disparity extractor; and at least one encoder, each of said at least one encoder encoding said differential data output from each of said at least one differentiator.

13. A three dimension picture coding system recited in claim 11, further comprising at least two picture enhancers:

one of said at least two picture enhancer outputting an enhanced picture to be used for said reference picture; and each of the others of said at least two picture enhancer outputting an enhanced picture used for said input picture for each of said at least one disparity extractor.

14. A three dimension picture coding system recited in claim 11, further comprising:

a first decoder for decoding output of said one of said at least two encoders for generating a reference picture;

at least one second decoder, each of said at least one second decoder decoding output of said each of the other of said at least two encoders for generating disparity data; and at least one disparity compensating predictors, each of said at least one disparity compensating predictors representing a disparity compensated predictive picture from said reference picture and said disparity data generated by each of said at least one second decoder.

15. A three dimension picture coding system recited in claim 12, further comprising:

a first decoder for decoding output of said one of said at least two encoders for generating a reference picture;

at least one second decoder, each of said at least one second decoder decoding output of said each of the other of said at least two encoders for generating disparity data;

at least one disparity compensating predictors, each of said at least one disparity compensating predictors representing a disparity compensated predictive picture from said reference picture and said disparity data generated by each of said at least one second decoder;

at least one third decoder, each of said at least one third decoder decoding output of each of said at least one encoder; and at least one adder, each of said at least one adder adding output of each of said at least one third decoder with output of corresponding each of said at least one disparity compensating predictors.

16. A three dimension picture coding system recited in claim 13, further comprising:

a first decoder for decoding output of said one of said at least two encoders for generating a reference picture;

at least one second decoder, each of said at least one second decoder decoding output of said each of the other of said at least two encoders for generating disparity data; and at least one disparity compensating predictors, each of said at least one disparity compensating predictors representing a disparity compensated predictive picture from said reference picture and said disparity data generated by each of said at least one second decoder.

17. A picture enhancer comprising a segmentation circuit, a first statistic information calculator, at least one second statistic information calculators, a focus discriminator and an enhanced picture reproducer; wherein:

said segmentation circuit performs segmentation of one of at least two input pictures, each of said at least two input pictures differently focused with each other, by clustering each pixel of said one of said at least two input picture into one of segments whereof initial coordinates are predetermined, referring to distance data calculated from pixel values of said each pixel, and statistic information delivered from one of said first statistic information calculator;

said first statistic information calculator calculates, for every of said segments, said statistic information of said one of said at least two input pictures including an average and dispersion of color components of pixels clustered into each of said segments and a center of gravity of said each of said segments, from said pixel values of said each pixel and segmentation data for said each pixel delivered from said segmentation circuit;

each of said at least one second statistic information calculator calculates, for every of said segments, said statistic information of each of the others of said one of said at least two input pictures including an average and dispersion of color components of pixels clustered into each of said segments, from said pixel values of said each pixel and segmentation data for said each pixel delivered from said segmentation circuit;

said focus discriminator selects, for each segment determined by said segmentation circuit, one of said at least two input pictures which has a focused segment giving a highest value of clearness for said each segment, calculating said clearness from statistic information concerning to said at least two input pictures delivered from said first statistic information calculator and said at least one second statistic information calculator; and said enhanced picture reproducer reproduces a clearness enhanced picture with focused segments of said at least two input pictures, each of said focused segments selected by said focus discriminator for each segment determined by said segmentation circuit.

18. A three dimension picture coding system recited in claim 17, further comprising at least two picture enhancers:

one of said at least two picture enhancer outputting an enhanced picture to be used for said reference picture; and each of the others of said at least two picture enhancer outputting an enhanced picture used for said input picture for each of said at least one disparity extractor.

19. A three dimension picture coding system recited in claim 18, further comprising:

a first decoder for decoding output of said one of said at least two encoders for generating a reference picture;

at least one second decoder, each of said at least one second decoder decoding output of said each of the other of said at least two encoders for generating disparity data;

at least one disparity compensating predictors, each of said at least one disparity compensating predictors representing a disparity compensated predictive picture from said reference picture and said disparity data generated by each of said at least one second decoder;

at least one third decoder, each of said at least one third decoder decoding output of each of said at least one encoder; and at least one adder, each of said at least one adder adding output of each of said at least one third decoder with output of corresponding each of said at least one disparity compensating predictors.

* * * * *